(12) United States Patent
Uchino et al.

(10) Patent No.: US 11,082,834 B2
(45) Date of Patent: Aug. 3, 2021

(54) USER APPARATUS AND BASE STATION

(71) Applicant: NTT DOCOMO, INC., Tokyo (JP)

(72) Inventors: Tooru Uchino, Tokyo (JP); Kazuki Takeda, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/119,828

(22) PCT Filed: Feb. 19, 2015

(86) PCT No.: PCT/JP2015/054601
§ 371 (c)(1),
(2) Date: Aug. 18, 2016

(87) PCT Pub. No.: WO2015/125860
PCT Pub. Date: Aug. 27, 2015

(65) Prior Publication Data
US 2017/0064541 A1  Mar. 2, 2017

(30) Foreign Application Priority Data

Feb. 19, 2014 (JP) .............................. JP2014-029957
Aug. 7, 2014 (JP) .............................. JP2014-161843

(51) Int. Cl.
*H04L 5/14* (2006.01)
*H04L 5/16* (2006.01)
(Continued)

(52) U.S. Cl.
CPC ............... *H04W 8/22* (2013.01); *H04L 5/001* (2013.01); *H04L 5/0092* (2013.01);
(Continued)

(58) Field of Classification Search
CPC ... H04L 1/0032; H04L 5/001; H04W 72/0453
(Continued)

(56) References Cited

U.S. PATENT DOCUMENTS 9,288,734 B2\* 3/2016 Jha ........................ H04W 76/28
9,699,825 B2\* 7/2017 Lee ........................ H04L 5/001
(Continued)

FOREIGN PATENT DOCUMENTS

CN        102378370 A    3/2012
JP        2013-042305 A  2/2013
(Continued)

OTHER PUBLICATIONS

Office Action issued in corresponding European Patent Application No. 15751341.7, dated Jul. 31, 2017 (10 pages).
(Continued)

*Primary Examiner* — Asad M Nawaz
*Assistant Examiner* — Jason A Harley
(74) *Attorney, Agent, or Firm* — Osha Bergman Watanabe & Burton LLP

(57) ABSTRACT

A user apparatus includes an information storage unit configured to store band combination information indicating a combination of bands that can be used in carrier aggregation in the user apparatus, and a notification control unit configured to explicitly or implicitly add, to the band combination information, capability information indicating whether the user apparatus is able to set a primary cell by using a band of a first duplex mode in the carrier aggregation, and to notify a base station of the band combination information to which the capability information is added.

17 Claims, 24 Drawing Sheets

(51) Int. Cl.
*H04W 76/10* (2018.01)
*H04W 88/06* (2009.01)
*H04W 8/22* (2009.01)
*H04L 5/00* (2006.01)
*H04W 72/04* (2009.01)

(52) U.S. Cl.
CPC .............. *H04L 5/0098* (2013.01); *H04L 5/14* (2013.01); *H04L 5/1469* (2013.01); *H04W 72/0413* (2013.01); *H04L 5/008* (2013.01); *H04L 5/0058* (2013.01); *H04L 5/16* (2013.01)

(58) Field of Classification Search
USPC ................................................ 370/280, 281
See application file for complete search history.

(56) References Cited

U.S. PATENT DOCUMENTS

| | | | |
|---|---|---|---|
| 2012/0106404 A1* | 5/2012 | Damnjanovic | H04L 5/001 370/279 |
| 2013/0051288 A1 | 2/2013 | Yamada et al. | |
| 2013/0114508 A1 | 5/2013 | Liang | |
| 2013/0242881 A1* | 9/2013 | Wang | H04L 1/18 370/329 |
| 2014/0162642 A1* | 6/2014 | Kwon | H04L 41/0853 455/435.1 |
| 2014/0328228 A1 | 11/2014 | Park et al. | |
| 2015/0110011 A1* | 4/2015 | Wei | H04W 74/006 370/329 |
| 2015/0124743 A1* | 5/2015 | Damnjanovic | H04L 5/0032 370/329 |
| 2015/0215826 A1* | 7/2015 | Yamada | H04W 36/0072 455/436 |
| 2015/0215967 A1* | 7/2015 | Han | H04W 74/0833 370/329 |
| 2015/0223095 A1* | 8/2015 | Centonza | H04B 17/24 455/67.11 |
| 2015/0264679 A1 | 9/2015 | Uchino et al. | |
| 2015/0319801 A1* | 11/2015 | Lee | H04W 74/0833 370/329 |

FOREIGN PATENT DOCUMENTS

| | | | |
|---|---|---|---|
| JP | 2014090369 A | 5/2014 | |
| JP | 2014090396 A | 5/2014 | |
| WO | 2013/077554 A1 | 5/2013 | |

OTHER PUBLICATIONS

CMCC, "Discussion on full/non-full duplex UE for TDD-FDD CA," 3GPP TSG RAN WG1 Meeting #75, R1-135629, San Francisco, USA, Nov. 11-15, 2013 (4 pages).
Huawei, HiSilicon, "Standard impact of TDD-FDD CA for UEs not supporting simultaneous transmission and reception," 3GPP TSG RAN WG1 Meeting #76, R1-140032, Prague, Czech Republic, Feb. 10-14, 2014 (5 pages).
International Search Report issued in PCT/JP2015/054601 dated Mar. 31, 2015 (2 pages).
Written Opinion of the International Searching Authority issued in PCT/JP2015/054601 dated Mar. 31, 2015 (4 pages).
NTT DOCOMO, Inc. et al; "WF on handling TDD-FDD CA sample bands in Rel-12"; 3GPP TSG RAN WG4 #70, R4-140241; Prague, Czech Republic; Feb. 10-14, 2014 (4 pages).
NTT DOCOMO, Inc. et al; "Impact level of TDD-FDD CA introduction on 36.101"; 3GPP TSG RAN WG4 #70, R4-140243; Prague, Czech Republic; Feb. 10-14, 2014 (3 pages).
3GPP TS 36.331 V10.9.0; "3rd Generation Partnership Project; Technical Specification Group Radio Access Network; Evolved Universal Terrestrial Radio Access (E-UTRA); Radio Resource Control (RRC); Protocol specification (Release 10)"; Mar. 2013 (307 pages).
3GPP TSG-RAN WG1 Meeting #76; R1-140619; NTT DOCOMO, Inc.; "Remaining issues on TDD-FDD CA"; Prague, Czech Republic, Feb. 10-14, 2014 (6 pages); [online]: <URL:http://www.3gpp.org/ftp/tsg_ran/WG1_RL1/TSGR1_76/Docs/R1-140619.zip>.
Extended Search Report issued in corresponding European Application No. 15751341.7, dated Dec. 8, 2016 (14 pages).
Pantech; "Glitch issue on independent activation/deactivation by each eNB for dual connectivity"; 3GPP TSG-RAN WG2 Meeting #85, R2-140251; Prague, Czech Republic; Feb. 10-14, 2014 (2 pages).
Notification of Reasons for Refusal issued in corresponding Japanese application No. 2014-161843, dated Mar. 24, 2015 (6 pages).
Decision to Grant a Patent issued in corresponding Japanese application No. 2014-161843, dated Jun. 16, 2015 (6 pages).
Office Action issued in the counterpart Japanese Patent Application No. 2015-141694, dated May 22, 2018 (7 pages).
Office Action issued in the counterpart Chinese Patent Application No. 201580008875.9, dated Jan. 4, 2019 (17 pages).
Office Action issued in counterpart Chinese Patent Application No. 201580008875.9, dated Jul. 2, 2019 (15 Pages).

* cited by examiner

FDD+FDD

TDD+TDD

FDD+TDD

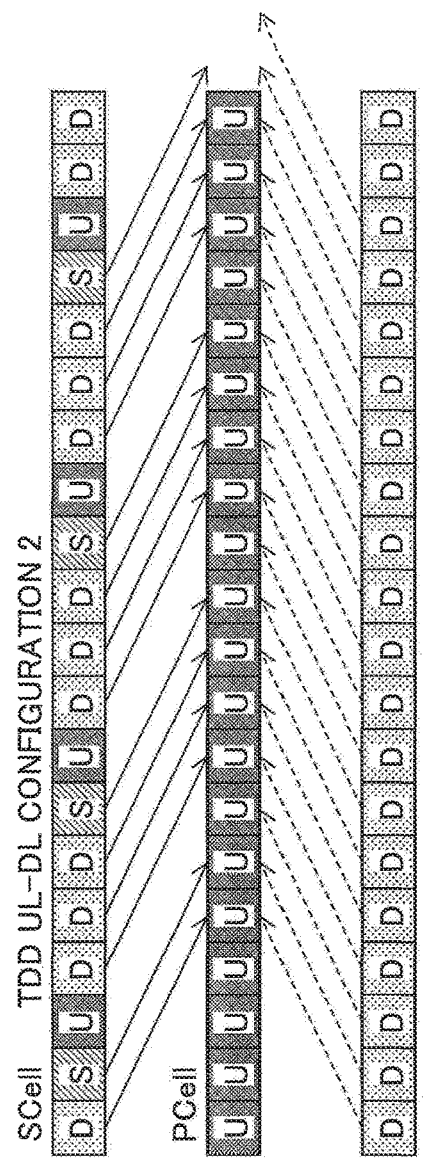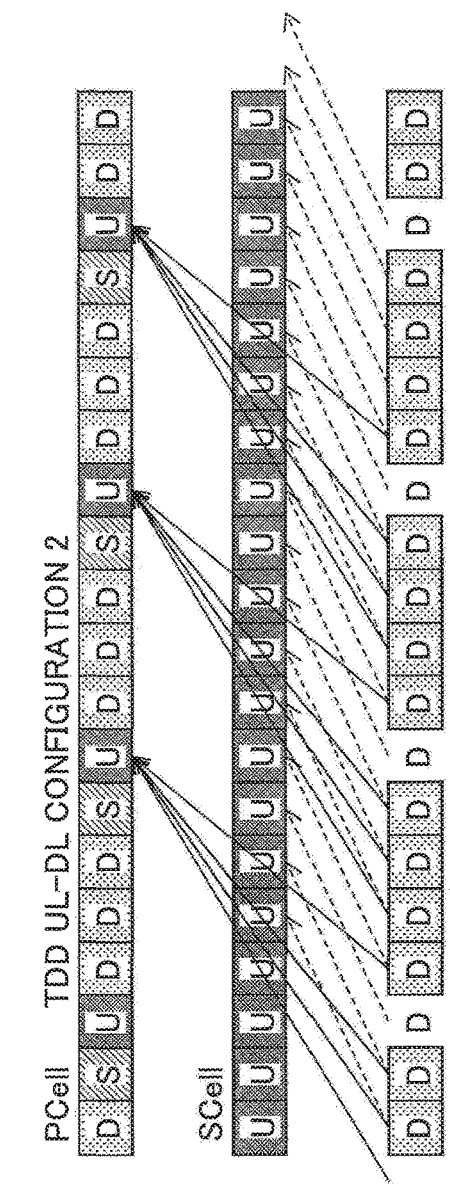
FIG.3 (a) FDD IS PCell
FIG.3 (b) TDD IS PCell

FIG.6

| DL | UL |
|---|---|
| XA | XA |
| YA | YA |
| ZA | ZA |
| XA_YA | XA |
| XA_YA | YA |
| XA_YA | XA_YA |
| YA_ZA | YA |
| YA_ZA | ZA |
| YA_ZA | YA_ZA |
| ZA_XA | XA |
| ZA_XA | ZA |
| ZA_XA | ZA_XA |
| XA_YA_ZA | XA |
| XA_YA_ZA | YA |
| XA_YA_ZA | ZA |
| XA_YA_ZA | XA_YA |
| XA_YA_ZA | YA_ZA |
| XA_YA_ZA | ZA_XA |

A ⟵ (indicating the XA_YA / XA_YA row)

FIG.7

| | DL | UL | TDD PCell CAPABILITY |
|---|---|---|---|
| | XA | XA | - |
| | YA | YA | - |
| | ZA | ZA | - |
| A | XA_YA | XA | TRUE |
| | XA_YA | YA | - |
| B | XA_YA | XA_YA | TRUE |
| | YA_ZA | YA | - |
| | YA_ZA | ZA | - |
| | YA_ZA | YA_ZA | - |
| | ZA_XA | XA | - |
| | ZA_XA | ZA | - |
| C | ZA_XA | ZA_XA | FALSE |
| | XA_YA_ZA | XA | - |
| | XA_YA_ZA | YA | - |
| | XA_YA_ZA | ZA | - |
| D | XA_YA_ZA | XA_YA | FALSE |
| | XA_YA_ZA | YA_ZA | - |
| E | XA_YA_ZA | ZA_XA | TRUE |

FIG.8

| | DL | UL | |
|---|---|---|---|
| | XA | XA | – |
| | YA | YA | – |
| | ZA | ZA | – |
| F | XA_YA | XA | – |
| | XA_YA | YA | – |
| G | XA_YA | XA_YA | – |
| | YA_ZA | YA | – |
| | YA_ZA | ZA | – |
| | YA_ZA | YA_ZA | – |
| A | ZA_XA | XA | NOT NOTIFIED |
| | ZA_XA | ZA | – |
| B | ZA_XA | ZA_XA | TDD PCell NON-SUPPORTED (NOTIFIED) |
| C | XA_YA_ZA | XA | NOT NOTIFIED |
| | XA_YA_ZA | YA | – |
| | XA_YA_ZA | ZA | – |
| D | XA_YA_ZA | XA_YA | TDD PCell NON-SUPPORTED (NOTIFIED) |
| | XA_YA_ZA | YA_ZA | – |
| E | XA_YA_ZA | ZA_XA | TDD PCell NON-SUPPORTED (NOTIFIED) |

SUBSET IS TDD-PCell NON-SUPPORTED

SUBSET IS TDD-PCell NON-SUPPORTED

FIG.9

| | DL | UL | FDD PCell CAPABILITY |
|---|---|---|---|
| | XA | XA | – |
| | YA | YA | – |
| | ZA | ZA | – |
| A | XA_YA | XA | TRUE |
| | XA_YA | YA | – |
| B | XA_YA | XA_YA | TRUE |
| | YA_ZA | YA | – |
| | YA_ZA | ZA | – |
| | YA_ZA | YA_ZA | – |
| | ZA_XA | XA | – |
| | ZA_XA | ZA | – |
| C | ZA_XA | ZA_XA | FALSE |
| | XA_YA_ZA | XA | – |
| | XA_YA_ZA | YA | – |
| | XA_YA_ZA | ZA | – |
| D | XA_YA_ZA | XA_YA | FALSE |
| | XA_YA_ZA | YA_ZA | – |
| E | XA_YA_ZA | ZA_XA | TRUE |

FIG.10

| | DL | UL | |
|---|---|---|---|
| | XA | XA | – |
| | YA | YA | – |
| | ZA | ZA | – |
| F | XA_YA | XA | – |
| | XA_YA | YA | – |
| G | XA_YA | XA_YA | – |
| | YA_ZA | YA | – |
| | YA_ZA | ZA | – |
| | YA_ZA | YA_ZA | – |
| A | ZA_XA | XA | NOT NOTIFIED |
| | ZA_XA | ZA | – |
| B | ZA_XA | ZA_XA | FDD PCell NON-SUPPORTED (NOTIFIED) |
| C | XA_YA_ZA | XA | NOT NOTIFIED |
| | XA_YA_ZA | YA | – |
| | XA_YA_ZA | ZA | – |
| D | XA_YA_ZA | XA_YA | FDD PCell NON-SUPPORTED (NOTIFIED) |
| | XA_YA_ZA | YA_ZA | – |
| E | XA_YA_ZA | ZA_XA | FDD PCell NON-SUPPORTED (NOTIFIED) |

SUBSET IS FDD-PCell NON-SUPPORTED

SUBSET IS FDD-PCell NON-SUPPORTED

FIG.13

| DL | UL | TDD PSCell CAPABILITY |
|---|---|---|
| XA | XA | – |
| YA | YA | – |
| ZA | ZA | – |
| XA_YA | XA | TRUE |
| XA_YA | YA | – |
| XA_YA | XA_YA | TRUE |
| YA_ZA | YA | – |
| YA_ZA | ZA | – |
| YA_ZA | YA_ZA | – |
| ZA_XA | XA | – |
| ZA_XA | ZA | – |
| ZA_XA | ZA_XA | FALSE |
| XA_YA_ZA | XA | – |
| XA_YA_ZA | YA | – |
| XA_YA_ZA | ZA | – |
| XA_YA_ZA | XA_YA | FALSE |
| XA_YA_ZA | YA_ZA | – |
| XA_YA_ZA | ZA_XA | TRUE |

FIG.14

| DL | UL | FDD PSCell CAPABILITY |
|---|---|---|
| XA | XA | – |
| YA | YA | – |
| ZA | ZA | – |
| XA_YA | XA | TRUE |
| XA_YA | YA | – |
| XA_YA | XA_YA | TRUE |
| YA_ZA | YA | – |
| YA_ZA | ZA | – |
| YA_ZA | YA_ZA | – |
| ZA_XA | XA | – |
| ZA_XA | ZA | – |
| ZA_XA | ZA_XA | FALSE |
| XA_YA_ZA | XA | – |
| XA_YA_ZA | YA | – |
| XA_YA_ZA | ZA | – |
| XA_YA_ZA | XA_YA | FALSE |
| XA_YA_ZA | YA_ZA | – |
| XA_YA_ZA | ZA_XA | TRUE |

FIG.19
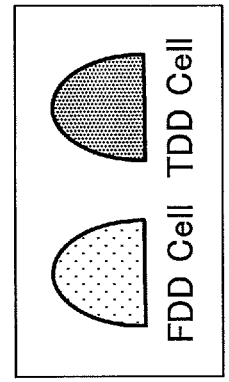
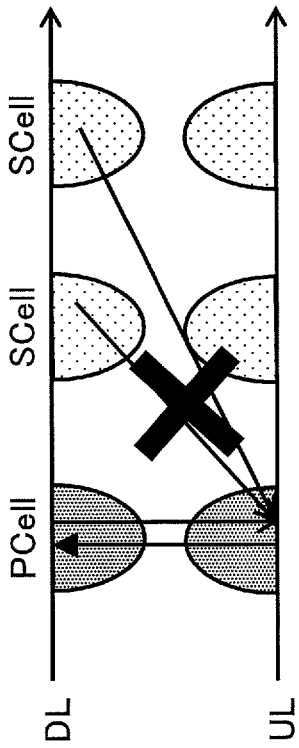
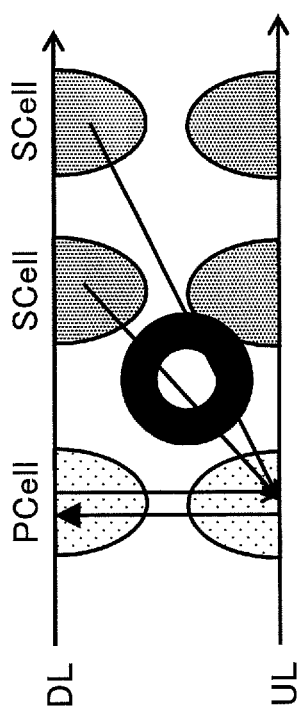

FIG.20
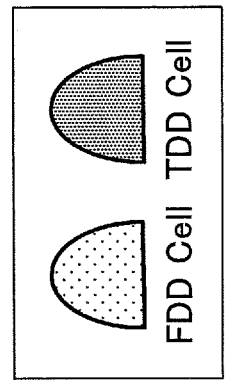
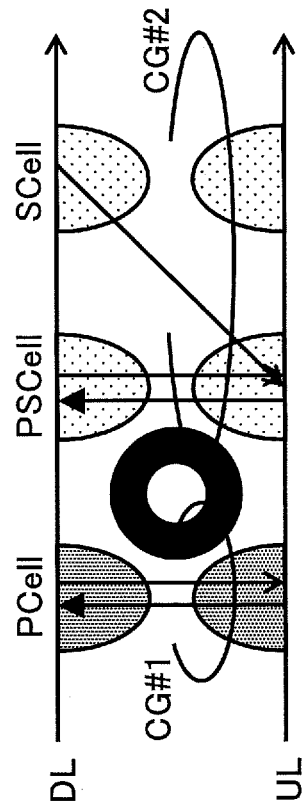
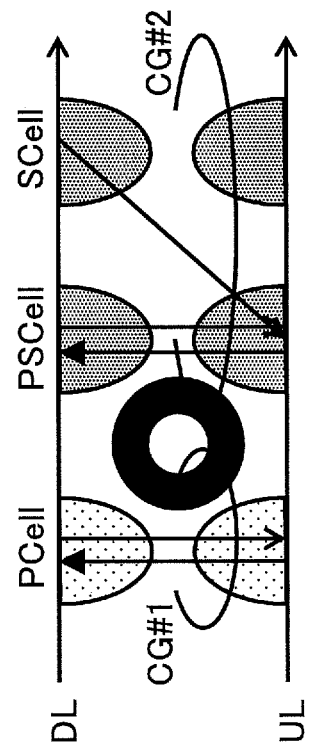

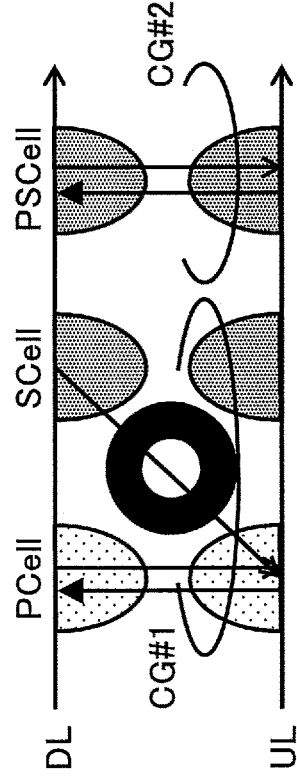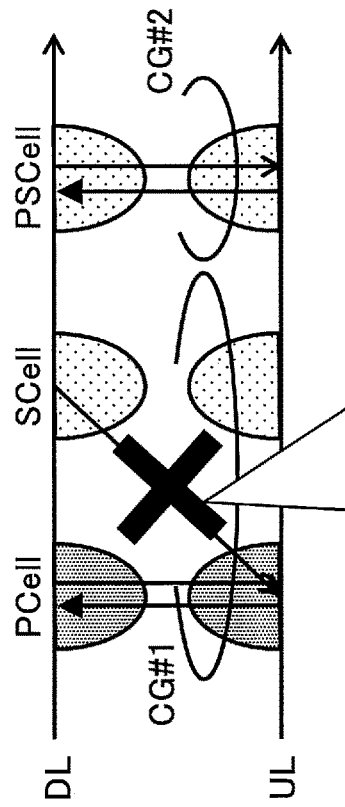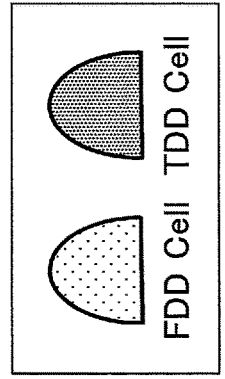
FIG.21

FIG.23

| NO. | DL | UL | PCell CAPABILITY |
|---|---|---|---|
| | ⋮ | ⋮ | ⋮ |
| 8 | A_B_C_D | A_B_C_D | (A, B, C, D)<br>=10010001 |
| 9 | A_B_C_D | A_B_C | (A, B, C, D)<br>=10010000 |
| | ⋮ | ⋮ | ⋮ |

A-TDD, B-FDD
C-TDD, D-FDD

FIG.24

| NO. | DL | UL | PCell CAPABILITY |
|---|---|---|---|
| | ⋮ | ⋮ | ⋮ |
| 8 | (A_B)_(C_D) | (A_B)_(C_D) | (A_B, C_D)<br>=1101 |
| 9 | (A_B)_(C_D) | (A_B)_C | (A_B, C_D)<br>=1100 |
| | ⋮ | ⋮ | ⋮ |

A-TDD, B-FDD
C-TDD, D-FDD

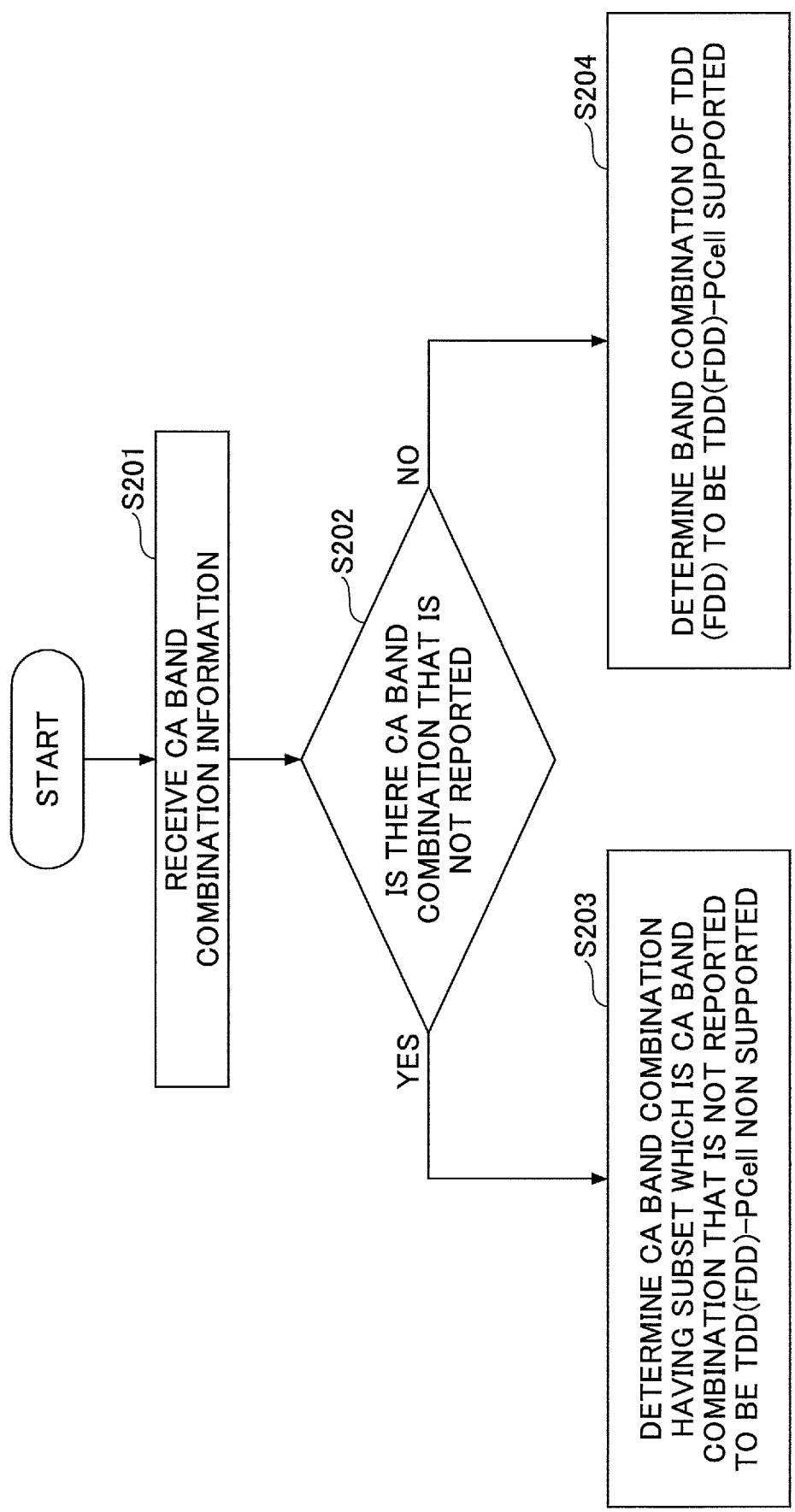

USER APPARATUS AND BASE STATION

TECHNICAL FIELD

The present invention relates to a technique in which a user apparatus UE in a mobile communication system such as LTE notifies a base station eNB of capability information of itself.

BACKGROUND ART

In LTE-Advanced, in order to realize throughput exceeding that of LTE while keeping backward compatibility with LTE, carrier aggregation (CA: carrier aggregation) for performing communication by simultaneously using a plurality of carries is adopted, in which a bandwidth (20 MHz at the maximum) supported in LTE is used as a basic unit. In carrier aggregation, a carrier which is a basic unit is called a component carrier (CC: component carrier).

When CA is performed, a PCell (Primary cell) that is a reliable cell for ensuring connectivity and an SCell (Secondary cell) that is an appendant cell are set for the user apparatus UE. The user apparatus UE connects to a PCell first, and then, an SCell can be added as necessary. The PCell is a cell similar to a cell, in the LTE scheme, supporting RLM (Radio Link Monitoring) and SPS (Semi-Persistent Scheduling) and the like.

The SCell is a cell which is set in the user apparatus UE by being added to the PCell. Addition and deletion of an SCell can be performed by RRC (Radio Resource Control) signaling. Since the SCell is in an deactivated state right after it is set in the user apparatus UE, communication becomes available (scheduling becomes available) only by activating it in MAC (Media Access Control) layer. A CC corresponding to the PCell is called PCC (Primary Component Carrier), and a CC corresponding to the SCell is called SCC (Secondary Component Carrier).

Also, in LTE, two duplex modes are defined which are frequency division duplex (Frequency Division Duplex: FDD) scheme and time division duplex (Time Division Duplex: TDD) scheme. In the FDD scheme, uplink communication and downlink communication are performed in frequency bands different from each other. In the TDD scheme, uplink communication and downlink communication use the same frequency band, and uplink communication and downlink communication are separated by time. Also, the duplex modes can be switched by different frequency (Inter-frequency) handover.

By the way, in LTE, a carrier having the frame structure type 1 (frame structure type 1) corresponds to a carrier of FDD, a carrier having the frame structure type (frame structure type 2) corresponds to a carrier of TDD. Thus, duplex modes can be identified by frame structure types.

RELATED ART DOCUMENT

Non Patent Document

[NON PATENT DOCUMENT 1] 3GPP TS 36.331 V10.9.0 (2013-03), 6.3.6 Other information elements, UE-EUTRA-Capability

SUMMARY OF THE INVENTION

As to CA and duplex modes described in the above-mentioned background art, in Rel.10-11 of LTE, a plurality of CCs that form the CA are limited to the same duplex mode. That is, for example, in a form of CA that forms a macro cell (cell of MeNB) and a small cell (cell of SeNB) as shown in FIGS. 1(a) and 1(b), the form is limited to a form in which any of a plurality of CCs (PCell, SCell) is FDD as shown by (a) or a form in which any of a plurality of CCs is TDD as shown by (b).

On the other hand, in Rel-12, it is being studied to expand CA to perform CA using CCs of different duplex modes. As an example of CA using CCs of different duplex modes, FIG. 2 shows a configuration using FDD for a PCell (PCC) and using TDD for an SCell (SCC). Hereinafter, CA using CCs of different duplex modes is referred to as TDD-FDD CA. Although FIG. 2 (and FIGS. 1(a) and 1(b)) is a diagram assuming DC (Dual Connectivity), this is merely an example, and TDD-FDD CA is applied to CA which is not DC. This corresponds to a case, for example, where the apparatus indicated as SeNB is an RRE (remote radio apparatus) extending from the base station eNB indicated as MeNB.

As to TDD-FDD CA, it is being considered to design such that both duplex modes of TDD and FDD can operate as a PCell. In this case, since a PUCCH (ACK/NACK for downlink data) is transmitted by a PCell in CA, it is easy to realize CA in which FDD, where an UL subframe always exists, is set to a PCell. However, as to CA in which TDD, where the UL subframe is limited, is set to a PCell, it is necessary to complexly change FDD control, so that there is a possibility that release of UE/eNB implementation is delayed.

That is, as shown in FIG. 3(a), for example, in a case where FDD is used for a PCell and TDD is used for an SCell, for data received in DL of the SCell, an UL PUCCH in the PCell can be transmitted in response to a timing of DL reception of the SCell. On the other hand, as shown in FIG. 3(b), in a case where TDD is used for a PCell and FDD is used for an SCell, since UL timing is limited in the PCell, control is necessary, for example, in which one UL transmission is performed in the PCell per several times of DL receptions of the SCell.

On the other hand, FD-LTE (LTE of FDD scheme) has already been widespread (used as a coverage band), and it is assumed that FD-LTE is also used as a PCell in CA. Thus, even if TDD-FDD CA in which the PCell is restricted to FDD is introduced, limitation of operation is not so strict.

In the above-mentioned situation, it can be considered that a user apparatus UE that supports only FDD for a PCell and a user apparatus UE that can support both of FDD and TDD for a PCell coexist. In LTE, it is defined that the user apparatus UE reports capability information (capability) of itself by a predetermined message "UE-EUTRA-Capability" (non-patent document 1: TS36.331). As capability information on CA, for example, there is information of CA band combination indicating combinations of bands usable when performing CA in the user apparatus UE.

However, in the current situation, since the user apparatus UE cannot notify the base station eNB whether setting of a PCell is limited to FDD or not, the base station eNB cannot identify whether setting of a PCell is limited to FDD or not for the user apparatus UE in the current situation. Thus, proper control cannot be performed.

One or more embodiments of the present invention provide a technique for a user apparatus to notify a base station of information indicating whether a primary cell can be set or not in a specific duplex mode, in a mobile communication system in which carrier aggregation is performed using a band of a first duplex mode and a band of a second duplex mode.

According to one or more embodiments of the present invention, there is provided a user apparatus in a mobile communication system configured to perform carrier aggregation using a band of a first duplex mode and a band of a second duplex mode, including:

an information storage unit configured to store band combination information indicating a combination of bands that can be used in the carrier aggregation in the user apparatus; and a notification control unit configured to explicitly or implicitly add, to the band combination information, capability information indicating whether the user apparatus is able to set a primary cell by using a band of the first duplex mode in the carrier aggregation, and to notify a base station of the band combination information to which the capability information is added.

According to one or more embodiments of the present invention, there is provided a base station in a mobile communication system configured to perform carrier aggregation using a band of a first duplex mode and a band of a second duplex mode, including:

a reception unit configured to receive band combination information indicating a combination of bands in the carrier aggregation from the user apparatus; and a determination unit configured to determine whether the user apparatus is able to set a primary cell using a band of the first duplex mode in the carrier aggregation based on capability information that is explicitly or implicitly added to the band combination information received by the reception unit.

Effect of the Present Invention

According to one or more embodiments of the present invention, there is provided a technique for a user apparatus to notify a base station of information indicating whether a primary cell can be set or not in a specific duplex mode, in a mobile communication system in which carrier aggregation is performed using a band of a first duplex mode and a band of a second duplex mode.

BRIEF DESCRIPTION OF THE DRAWINGS

FIGS. 3(a) and 3(b) are diagrams showing an example of communication of DL and UL in TDD-FDD CA;

FIG. 6 is a diagram showing an example of CA band combination information notified to the base station eNB by the user apparatus UE that can set a PCell by both TDD/FDD in a notification example 1;

FIG. 7 is a diagram showing an example of CA band combination information notified to the base station eNB by the user apparatus UE that can set a PCell by only a part of TDD in the notification example 1;

FIG. 8 is a diagram showing an example of CA band combination information notified to the base station eNB by the user apparatus UE that can set a PCell by only a part of TDD in the notification example 2;

FIG. 9 is a diagram showing an example (corresponding to the notification example 1) of CA band combination information notified to the base station eNB by the user apparatus UE that can set a PCell by only a part of FDD in an modified example;

FIG. 10 is a diagram showing an example (corresponding to the notification example 2) of CA band combination information notified to the base station eNB by the user apparatus UE that can set a PCell by only a part of FDD in an modified example;

FIG. 13 is a diagram for explaining a notification example 2 in the modified example 3;

FIG. 14 is a diagram for explaining a notification example 2 in the modified example 3;

FIG. 19 is a diagram for explaining an assumed operation example in a case where PCell duplex mode capability is replaced in the modified example 4;

FIG. 20 is a diagram for explaining an assumed operation example in a case where PCell duplex mode capability is replaced in the modified example 4;

FIG. 21 is a diagram for explaining an assumed operation example in a case where PCell duplex mode capability is replaced in the modified example 4;

FIG. 23 is a diagram for explaining a notification example 1 in the modified example 5;

FIG. 24 is a diagram for explaining a notification example 2 in the modified example 5;

FIG. 28 is a flowchart showing operation of the base station eNB.

EMBODIMENTS FOR CARRYING OUT THE INVENTION

In the following, one or more embodiments of the present invention are described with reference to figures. The embodiments described below are merely examples, and the embodiments to which the present invention is applied are not limited to the embodiments below. For example, although it is assumed that the communication system of the present embodiments support LTE including LTE-Advanced, one or more embodiments of the present invention can be applied not only to LTE but also to other schemes performing CA (including DC). Also, in the following, the term "LTE" is used as having meaning including LTE-Advanced unless specifically otherwise stated.

(System Whole Configuration)

Figure 1:
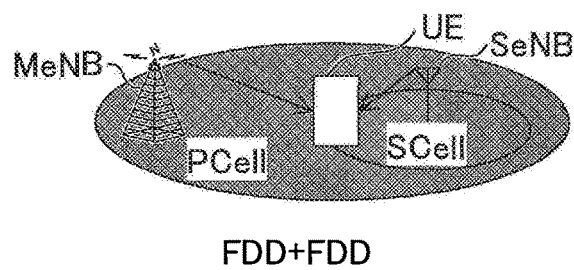
FIGS. 1(a) and 1(b) are diagrams showing an example of CA using the same duplex mode in a plurality of CCs.
Figure 1:
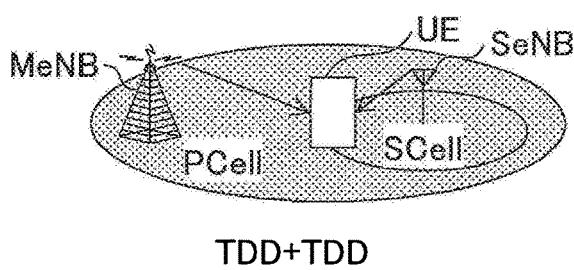
Figure 2:
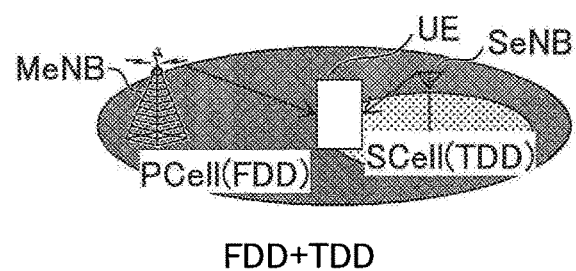
FIG. 2 is a diagram showing an example of CA using different duplex modes in a plurality of CCs.
Figure 4:
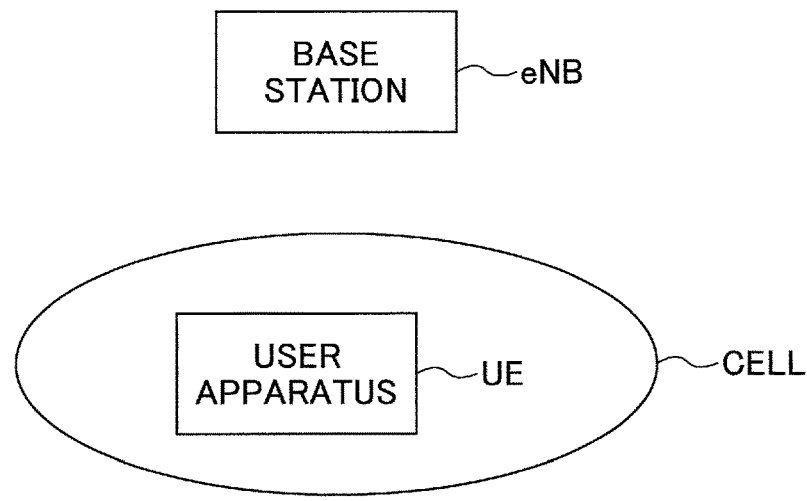
FIG. 4 is a block diagram of a communication system of one or more embodiments of the present invention.

FIG. 4 shows a block diagram of a communication system in one or more embodiments of the present invention (including all modified examples). The communication system of one or more embodiments is a communication system of an LTE scheme, and as shown in FIG. 4, includes a user apparatus UE and a base station eNB. For example, an RRE is remotely connected to the base station eNB, so that the base station eNB can form a small cell and a macro cell. The user apparatus UE and the base station eNB can perform TDD-FDD CA. Although FIG. 4 shows one user apparatus UE and one base station eNB, this is merely an example, and a plurality of user apparatuses UE and base stations eNB may exist. Also, the user apparatus UE may be provided with a capability of performing communication with a plurality of base stations eNB simultaneously (Dual Connectivity).

Figure 5:
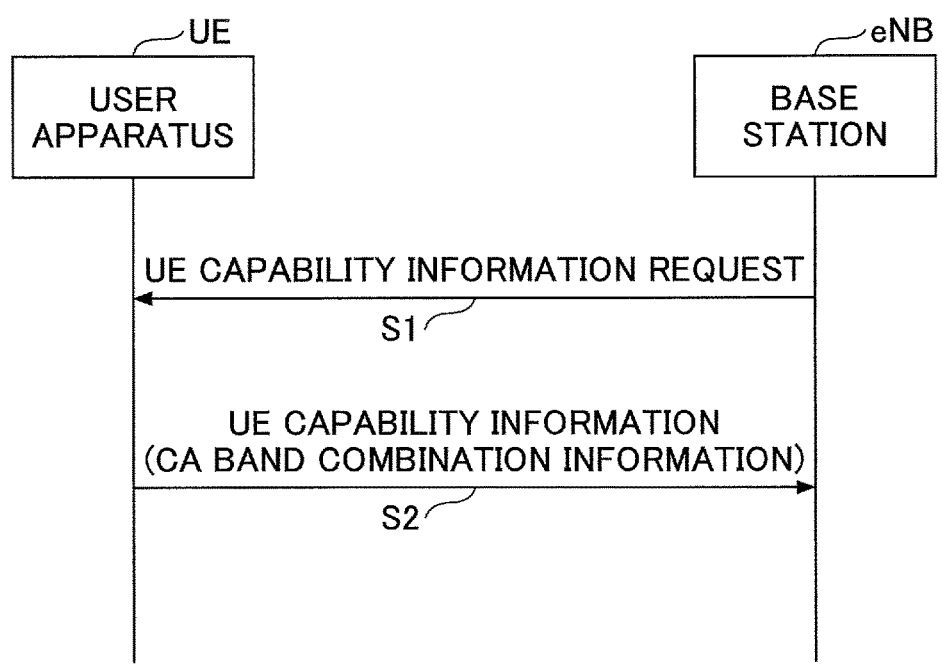
FIG. 5 is a sequence diagram indicating operation of a communication system of one or more embodiments of the present invention.

In one or more embodiments, as shown in FIG. 5, the user apparatus UE transmits UE capability information to the base station eNB (step 2) based on UE capability information request (example: UE capability enquiry) transmitted from the base station eNB in step 1.

By the way, the notification method shown in FIG. 5 is merely an example, and for example, the user apparatus UE may notify the base station eNB of the UE capability information without receiving UE capability information request from the base station eNB.

In the notification of the capability information, the user apparatus UE notifies the base station eNB of information indicating a combination of bands supported by the user apparatus UE in CA (CA band combination). It is defined that, when the user apparatus UE can support a plurality of types of CA band combinations, the user apparatus UE notify the base station eNB of all of supported patterns of CA band combinations.

As described above, the conventional base station eNB cannot identify whether setting of a PCell is limited to FDD or not for the user apparatus UE. In contrast, in one or more embodiments, information (Capability) indicating whether setting of a PCell is limited to FDD or not is transmitted.

Accordingly, the base station eNB does not configure CA in which a band of TDD is used as a PCell for a user apparatus UE that notifies of (including implicit notification) capability information indicating that setting of a PCell is limited to FDD (in a case where after-mentioned modified example 4 is not considered). Also, when the base station eNB receives an RRC message indicating setting of CA in which a band of TDD is used as a PCell from a user apparatus UE that notifies of capability information indicating that setting of a PCell is limited to FDD, the base station eNB determines that the notification is not a normal notification to notify the user apparatus UE of an error message (example: reconfiguration failure).

In one or more embodiments, as examples of methods of notification of capability information indicating whether setting of a PCell is limited to FDD or not, a notification example 1 and a notification example 2 are described. In the notification example 1, whether setting of a PCell is limited to FDD or not is explicitly reported by adding a new information element (IE: Information Element) in a message for notifying the base station eNB of capability information from the user apparatus UE. In the notification example 2, notification is performed implicitly without changing the current information element. In the following, each example is described in more detail.

In the following, when intending a combination of bands, "CA band combination" is mainly used, and when intending information conveyed by a message, "CA band combination information" and the like is mainly used.

Notification Example 1

In the notification example 1, information indicating whether a band of TDD can be set as a PCell is notified for each CA band combination of TDD-FDD.

FIG. 6 shows an example of CA band combination information that the user apparatus UE notifies the base station eNB when there is no limitation of duplex modes by which a PCell can be set so that both TDD band and FDD band can be set as a PCell in the user apparatus UE.

The example of FIG. 6 shows an example in a case where the user apparatus UE can perform 3DL/2UL CA using three bands of X(TDD), Y(FDD) and Z(FDD). Here, X(TDD) means that band X corresponds to TDD, Y(FDD) means that band Y corresponds to FDD, and Z(FDD) means that band Y corresponds to FDD.

"3DL/2UL" indicates that CA is available in downlink (DL) using carriers of three bands, and that CA is available in uplink (UL) using carriers of two bands.

The example shown FIG. 6 indicates that the user apparatus UE can perform CA in all combinations of bands of 3DL/2UL. By the way, "all combinations" does not necessarily mean all combinations in an arithmetic sense, but means predetermined combinations as combinations that can be combined in actuality. By the way, it is defined to perform notification as subsets even when CA is not performed (DL:XA, UL:XA, and the like).

Also, "A" in "XA" and the like indicates CA bandwidthclass, which indicates bandwidths and the number of CCs that can be aggregated in the user apparatus UE for each frequency band. For example, in a case where frequency bands are 2 GHz (Band 1) and 1.5 GHz (Band 21), the maximum number of CC(s) in each band is 1, the maximum bandwidth that can be aggregated is 100 RBs, and the CA is inter-band CA of 2 CCs, it is described as 1A_21A.

In one or more embodiments, when there is no limitation in duplex modes by which a PCell can be set in the user apparatus UE, as shown in FIG. 6, the user apparatus UE notifies the base station eNB of information of all CA band combinations that the user apparatus UE supports without attaching information indicating whether a PCell can be set by TDD or not (information indicating whether setting of a PCell is limited to FDD or not).

For example, in FIG. 6, as to a CA band combination shown as A, the user apparatus UE can set a PCell of TDD by the band X and can set an SCell of FDD by the band Y, and also the user apparatus UE can set a PCell of FDD by the band Y and can set an SCell of TDD by the band X. As to which band combination is used for CA and as to which bands are used for a PCell and an SCell in actuality, the base station eNB can instruct (set) to the user apparatus UE according to quality and the like of the carriers (frequencies), for example.

When there is a limitation in the user apparatus UE in duplex modes for setting a PCell, as shown in FIG. 7, the user apparatus UE reports information of all CA band combinations that the user apparatus UE supports by attaching information indicating whether a PCell can be set by TDD or not.

That is, in the example of FIG. 7, an information element (TDD PCell capability in the example of FIG. 7) indicating whether a PCell can be set by TDD is added to a message for notifying of CA band combination, so that a flag (True, False in the example of FIG. 7) indicating whether a PCell can be actually set by TDD is added for a CA band combination where PCell setting in TDD can be possibly performed.

For example, as to CA band combinations indicated by A, B, C, D and E of FIG. 7, since band X(TDD) exists for both of DL and UL, there is a possibility that band X can be set as a PCell. Then, as to A, B and E, since the flag is True, the user apparatus UE can perform PCell setting in the band X(TDD) as to the CA band combinations indicated by A and B. On the other hand, as to C and D, since the flag is False, it is not possible to perform PCell setting using band X (TDD). Therefore, for example, as to the CA band combination indicated as C of FIG. 7, a PCell using band Z(FDD) and an SCell using band X(TDD) can only be set.

In the example shown in FIG. 7, although the flag indicating whether a PCell can be set in TDD is attached for each CA band combination in which PCell setting by TDD can be possibly performed, information (flag) indicating whether a PCell can be set by TDD may be attached to the whole CA band combination information that the user apparatus UE can support.

In this case, for example, when a flag of True is attached, and when there are CA band combinations (example: A, B, C, D and E in FIG. 7) in which PCell setting by TDD can be possibly performed in CA band combination information received from the user apparatus UE, the base station eNB interprets that all of these are CA band combinations in which PCell setting can be performed by TDD.

On the other hand, for example, in a case where a flag of False is attached, even when there are CA band combinations in which PCell setting by TDD can be possibly performed in CA band combination information received from the user apparatus UE, the base station eNB interprets that all of these are CA band combinations in which PCell setting cannot be performed by TDD.

In the case of True, since the situation is the same as that shown in FIG. 6, the flag indicating whether a PCell can be set by TDD may not be attached.

Also, in reverse, in the case of False, the flag indicating whether a PCell can be set by TDD may not be attached. In this case, in a case where a flag of True is attached, when there are CA band combinations in which PCell setting by TDD can be possibly performed in CA band combination information notified from the user apparatus UE, the base station eNB interprets that all of them are CA band combinations in which PCell setting can be performed by TDD. On the other hand, in a case where a flag is not attached, even when there are CA band combinations in which PCell setting by TDD can be possibly performed in CA band combination information notified from the user apparatus UE, the base station eNB interprets that all of them are CA band combinations in which PCell setting cannot be performed by TDD.

Notification Example 2

Next, a notification example 2 is described. In the notification example 2, the user apparatus UE implicitly notifies the base station eNB whether PCell setting by TDD is available in the user apparatus UE for each CA band combination in which there is a possibility that PCell setting by TDD is performed, without adding information element and the like to a current message for notifying of CA combination information.

More specifically, the user apparatus UE does not notify the base station eNB of a CA band combination in which PCell setting by TDD cannot be performed, so as to implicitly notify that PCell setting by TDD cannot be performed for a CA band combination having a subset which is the not-notified CA band combination.

Here, a CA band combination of a subset of a certain CA band combination is a CA band combination that has a part or all of bands in DL of the certain CA band combination for the DL, that has a part or all of bands in UL of the certain CA band combination for the UL, and that has bands, for forming CA, the number of which is smaller than the number of bands of the certain CA band combination in DL or in UL or for both of DL and UL.

Which CA band combination to select as a subset for a certain CA band combination is not limited to the above-mentioned definition, and for example, subsets for a certain CA band combination may be individually determined.

Also, as to a CA band combination which is a subset of a certain CA band combination, in relation to the CA band combination of the subset, the certain CA band combination may be referred to as an upper CA band combination.

As an example, subsets of a CA band combination (DL: XA_YA_ZA, UL:ZA_XA) indicated by E in the before-mentioned CA band combination information in FIG. 7 are (DL:XA_YA_ZA,UL:ZA), (DL:XA_YA_ZA,UL:XA), (DL:ZA_XA,UL:ZA_XA), (DL:ZA_XA,UL:ZA), (DL: ZA_XA,UL:XA), (DL:YA_ZA,UL:ZA), and (DL:XA_YA, UL:XA). By the way, although (DL:ZA,UL:ZA) and (DL: XA,UL:XA) may be included in subsets, since these are not ones for forming CA, these are not included in subsets of the above-mentioned CA band combination.

In the notification example 2, when there is no limitation for duplex modes by which a PCell can be set in the user apparatus UE, like the case of the notification example 1, as shown in FIG. 6, the user apparatus UE notifies the base station eNB of information of all CA band combinations that the user apparatus UE supports. The base station eNB that receives the information interprets that, as for the CA band combination indicated by A in FIG. 6, for example, the user apparatus UE performing the notification can set a PCell of TDD using a carrier of band X and set an SCell of FDD using a carrier of band Y, and also can set a PCell of FDD using a carrier of band Y and set an SCell of TDD using a carrier of band X.

FIG. 8 shows an example of CA band combination information to be notified to the base station eNB when there is a limitation in duplex modes for setting a PCell in the user apparatus UE. In FIG. 8, the description in the right side ("no notification" and the like) is explanation and is not information for notification.

For example, in a case where a CA band combination indicated as A is not notified, that is, in a case where CA band combination information that does not include the CA band combination indicated as A is notified, the base station eNB determines that setting of the CA band combination indicated by A is not available, and that PCell setting by TDD for B, C, D and E that are CA combinations having the CA band combination indicated by A as a subset is unavailable. In this case, B, C, D and E are notified, and for example, as to B, it is determined that CA is available in which band Z is a PCell and band X is an SCell. Same applies to C, D and E.

Also, in a case where A is not notified, the base station eNB determines that PCell setting by TDD is available for F and G which are CA band combinations that does not have A as a subset and that can perform PCell setting by TDD.

Next, for example, in a case where a CA band combination indicated by C is not notified (A and B are notified), that is, in a case where CA band combination information that does not include the CA band combination indicated by C is notified, the base station eNB determines that setting of the CA band combination indicated by C is unavailable, and that PCell setting by TDD is unavailable for D and E that are CA combinations having the CA band combination indicated by C as a subset. In this case, D and E are notified, so that, for example, as to D, it is determined that CA is available in which band Y is a PCell and band X is an SCell. Same applied to E.

Also, when C is not notified, the base station eNB determines that PCell setting by TDD is available for F, G, A and B which are CA band combinations, that do not have C as a subset, in which PCell setting by TDD can be performed.

Also, for example, in a case where A and C are not notified, that is, in a case where CA band combination information that does not include CA band combinations indicated by A and C is notified, the base station eNB determines that setting of CA band combinations indicated by A and C is unavailable, and that PCell setting by TDD is unavailable for B which is a CA band combination having the CA band combination indicated by A as a subset, and further, determines that PCell setting by TDD is unavailable for D and E which are CA band combinations having the CA band combination indicated by C as a subset.

In the notification example 2, since PCell setting by TDD becomes unavailable for all CA band combinations that have a not-notified CA band combination as a subset, the number of variations of CA band combinations for which availability of PCell setting by TDD can be notified is smaller than that of the notification example 1. However, in the notification example 2, there is a merit that an existing notification message can be utilized as it is.

Also, the notification example 1 and the notification example 2 may be used together. For example, True or false may be explicitly indicated for a part of CA band combinations like the notification example 1, and implicit notification may be performed for a part of CA band combinations like the notification example 2.

In the following, each modified example is described. Examples described so far are to be referred to as the basic example.

Modified Example 1

In TDD, in TDD, there are a Full-duplex mode in which transmission and reception can be performed simultaneously and a Half-duplex mode in which transmission and reception cannot be performed simultaneously, and the user apparatus UE notifies the base station eNB of capability information (capability) indicating which is supported for each band. By the way, the user apparatus UE up to Rel.10 supporting TDD is Half-duplex.

A case where the Full-duplex mode is necessary in TDD is, for example, a case where, in CA using a plurality of component carriers (that are CC1 and CC2 for convenience sake) of TDD, a DL subframe of the CC1 and an UL subframe of the CC2 occur at the same time.

Also, in TDD-FDD CA, for example as shown in FIGS. 3(a) and 3(b), normally, UL TDD and DL FDD occur at the same time, and DL TDD and UL FDD occur at the same time. Thus, communication of the Full-duplex mode is performed.

However, although the user apparatus UE supports only the Half-duplex mode, TDD-FDD CA is available, and in that case, for example, when there is UL data in the user apparatus UE, the base station eNB performs control (this control is merely an example) to cause the user apparatus UE to transmit the data preferentially, and during the transmission, stop downlink data. That is, in TDD-FDD CA, it is necessary that the base station eNB ascertains whether the user apparatus UE supports the Full-duplex mode or supports the Half-duplex mode.

Here, a user apparatus UE supporting TDD-FDD designed based on FDD basically supports the Full-duplex mode. However, there is a possibility in that a user apparatus UE that is designed based on Rel-10 TDD-UE and that supports TDD-FDD CA of TDD-PCell capability=False supports only the Half-duplex mode.

Thus, in the modified example, the user apparatus UE notifies of capability information (capability) indicating whether the user apparatus UE supports the Full-duplex mode or the Half-duplex mode in addition to information of TDD-PCell capability described so far.

An example 1 and an example 2 of concrete notification methods are described in the following. In the following examples, it is assumed that, when TDD-PCell capability=True in the user apparatus UE, the user apparatus UE supports the Full-duplex mode.

Modified Example 1

Notification Example 1

In the notification example 1 of the modified example, when TDD-PCell capability=False in the user apparatus UE, the user apparatus UE explicitly notifies the base station eNB of capability information indicating whether the user apparatus UE supports the Full-duplex mode or the Half-duplex. For example, when it supports the Full-duplex mode, "True" is notified indicating that the Full-duplex mode is supported. In this case, when the base station eNB receives True, the base station eNB determines that the user apparatus UE supports the Full-duplex mode, and when the base station eNB does not receive capability information on Half/Full-duplex mode, the base station eNB determines that the user apparatus UE supports the Half-duplex mode.

The case of TDD-PCell capability=False in the user apparatus UE is basically a case where there is no CA band combination that supports TDD-PCell. Also, the above-mentioned capability information on Half/Full-duplex mode may be notified for each CA band combination that becomes TDD-PCell capability=False.

Modified Example 1

Notification Example 2

In the notification example 2 of the modified example, the user apparatus UE does not explicitly notify the base station eNB of capability information on the Half/Full-duplex mode. In the notification example 2, the base station eNB that receives capability information of TDD-PCell capability=False from the user apparatus UE determines that the user apparatus UE supports the Half-duplex mode. Or, the base station eNB that receives capability information of TDD-PCell capability=False from the user apparatus UE may determine that the user apparatus UE supports the Full-duplex mode. One of them is defined by definition.

Capability information of TDD-PCell capability=False in the user apparatus UE is, basically, a case where there is no CA band combination that can support TDD-PCell. However, the base station eNB may determine Half/Full-duplex mode as mentioned above for each CA band combination that becomes TDD-PCell capability=False.

When the base station eNB receives at least one CA band combination of TDD-PCell capability=True from the user apparatus UE, the base station eNB may determine that the user apparatus UE supports the Full-duplex mode.

Modified Example 2

One or more embodiments have been described so far for notification of capability information on whether CA in which TDD is used as a PCell can be performed in the user apparatus UE. In reverse, notification of capability information on whether CA in which FDD is used as a PCell can be performed can be executed in the same way as described so far.

For example, for causing a user apparatus UE designed based on TDD to support TDD-FDD CA, there is a possibility in that, depending on implementation, implementation becomes easier by implementing control of TDD together with control of FDD. From these viewpoints, it can be considered to perform capability information notification on whether CA in which FDD is used for a PCell can be performed. The method of notification on whether CA in which FDD is used for a PCell can be performed corresponds to methods in which TDD is replaced with FDD and FDD is replaced with TDD in the description so far.

For example, in the same as the example in which an information element of TDD-PCell capability is provide, as shown in FIG. 9, capability information can be notified by providing an information element of FDD-PCell capability. Also, in the same way as the case to implicitly notify of TDD-PCell capability, as shown in FIG. 10, FDD-PCell capability can be implicitly notified.

Also, both of capability information on whether CA in which TDD is used as an PCell can be performed and capability information on whether CA in which FDD is used as an PCell can be performed may be notified.

Modified Example 3

Next, a modified example 3 is described. Although a PUCCH is supported only in a PCell in LTE up to Rel-11, it is being studied to transmit a PUCCH also in an SCell in Rel-12. The modified example 3 (and after-mentioned modified example 4) is related to PUCCH transmission in an SCell. As an example for performing PUCCH transmission in an SCell, there is Dual Connectivity (to be referred to as DC hereinafter).

Figure 11:
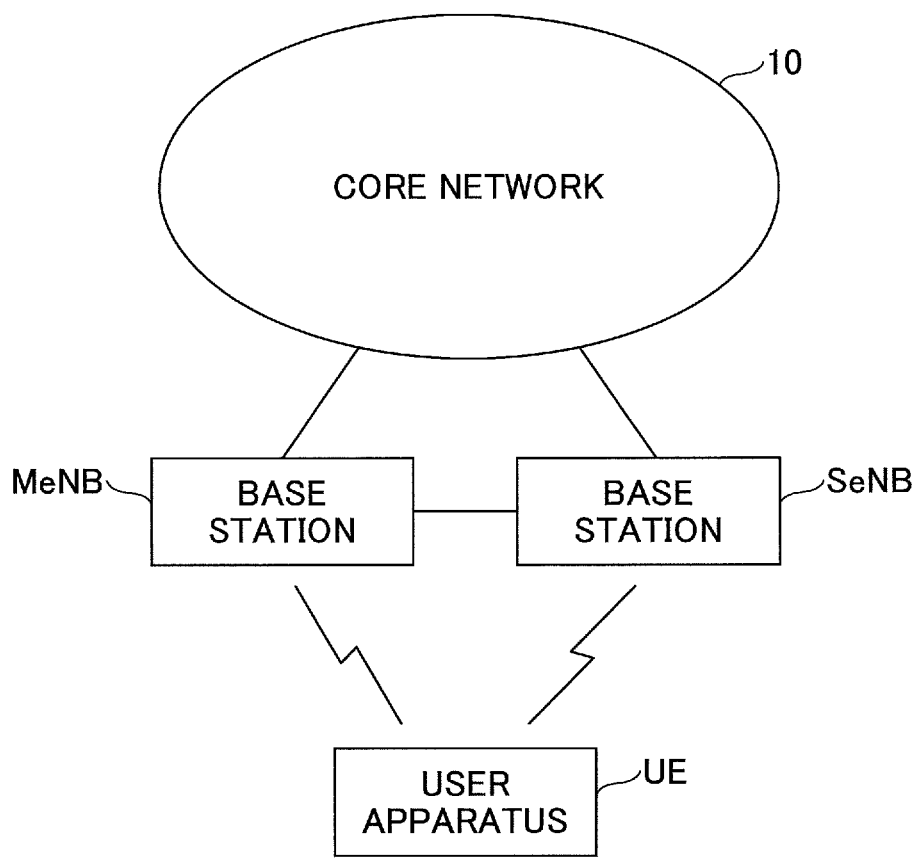
FIG. 11 is a diagram showing a configuration example of a communication system in a modified example 3.

FIG. 11 is a diagram showing a configuration example of a communication system that performs DC in the modified example 3 (same applied to modified example 4). As shown in FIG. 11, the communication system includes a base station MeNB and a base station SeNB each connected to a core network 10, which can perform DC with a user apparatus UE. Also, communication is available between the base station MeNB and the base station SeNB by an X2 interface, for example.

DC is a kind of CA, and it is also referred to as Inter eNB CA (inter-base station carrier aggregation), in which Master-eNB (MeNB) and Secondary-eNB (SeNB) are introduced as mentioned above.

In DC, a cell group formed by cell(s) (one or a plurality of cells) under an MeNB is called MCG (Master Cell Group), and a cell group formed by cell(s) (one or a plurality of cells) under an SeNB is called SCG (Secondary Cell Group). An UL CC is set in at least one SCell in the SCG, and PUCCH is set in one of the at least one SCell. The SCell is called PSCell (primary SCell). Also, this may be called a special cell.

In the communication system shown in FIG. 11, for example, a PCell and an SCell (including PSCell) can be set by using an MCG as a macro cell and an SCG as a small cell. Addition, deletion, setting change of an SCell (including PSCell) in the user apparatus UE is performed by an RRC signaling from the MeNB, but, it is not limited to this. Also, activation/de-activation of an SCell may be performed by the base station SeNB for the SCG and may be performed by the base station MeNB for the MCG, or it may be performed by the base station MeNB for all SCells.

DC performs control for performing inter-eNB CA by CCs under eNBs connected by a backhaul of a large delay, and it is difficult to feed back HARQ ACK/NACK in the SCell side via the PCell. Thus, as mentioned above, a PUCCH in the SCell becomes necessary.

In CA which is not DC, when the number of CCs increases, PUCCH resource in the PCell decreases, throughput decreases, the number of UEs that can be connected decreases, so that cell capacity decreases. Thus, it is being studied to transmit a PUCCH in an SCell like the above-mentioned PSCell also in CA that is not DC. The CA using such an SCell is referred to as "CA with SCell PUCCH". Also, an SCell transmitting a PUCCH may be referred to as PUCCH-SCell. Also, PSCell and PUCCH-SCell may be collectively referred to as a special cell. In both of the PSCell and the PUCCH-SCell, since ACK/NACK is transmitted by setting a PUCCH in the group of SCells like a PCell, they can be considered as a kind of "primary cell".

Figure 12:
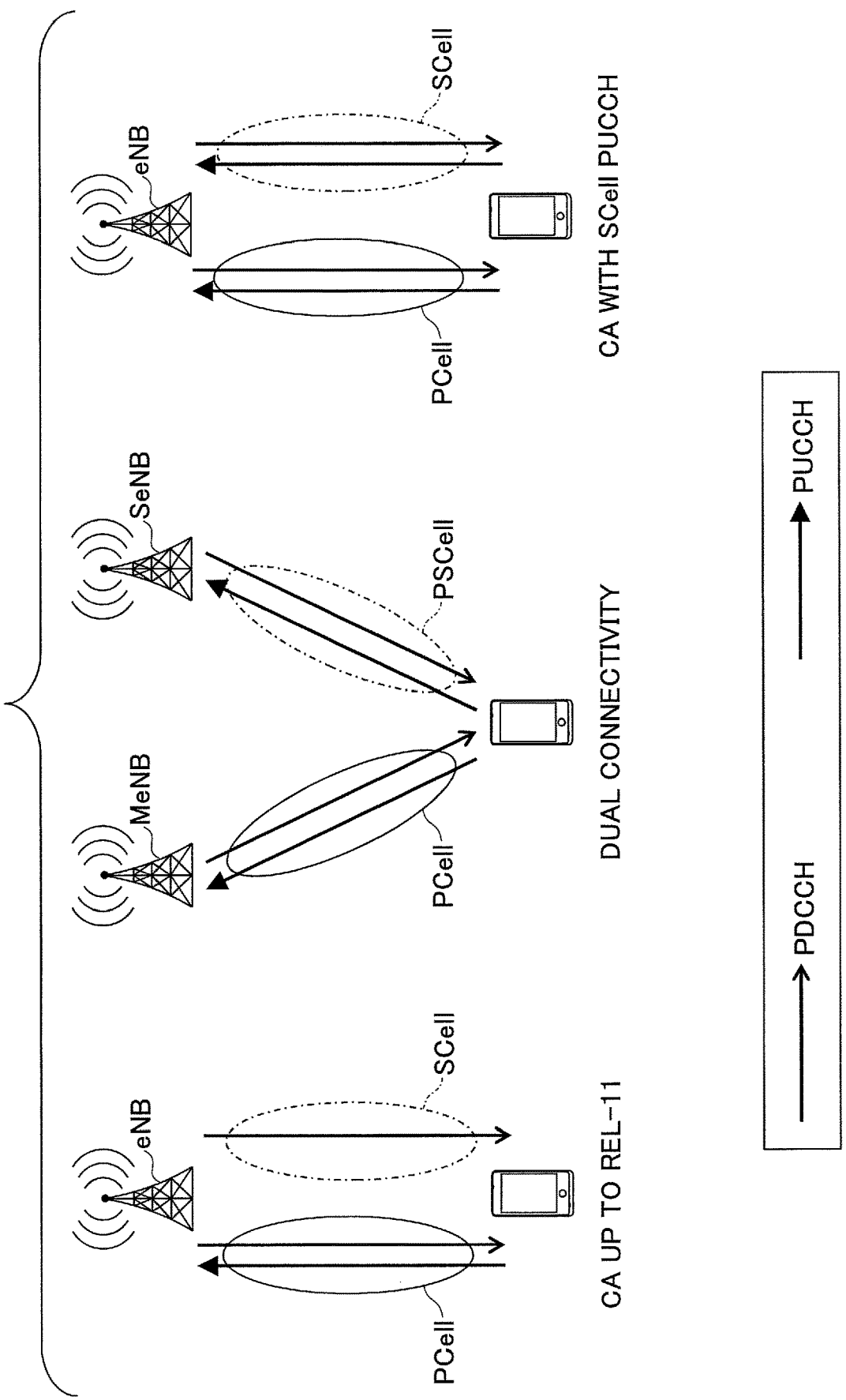
FIG. 12 is a diagram for explaining a PUCCH of an SCell in CA.

FIG. 12 is a diagram showing support of PUCCH transmission in an SCell for each scheme. As shown in FIG. 12, in CA up to Rel-11, although a PUCCH can be transmitted only in the PCell, a PUCCH can be also transmitted in an SCell (PSCell) in DC and in CA with SCell PUCCH.

Notification of a capability described so far indicates whether PCell setting of TDD is available or PCell setting of FDD is available in a CA band combination, but, PSCell/PUCCH-SCeLL (meaning PSCell or PUCCH-SCell) is not considered as mentioned above. However, the situation as to PSCell/PUCCH-SCell where a PUCCH is set is similar to the situation as to PCell described with reference to FIGS. 3(a) and 3(b). Thus, the modified example 3 is configured so as to be able to notify of a capability on PSCell/PUCCH-SCell. In the following, a notification example 1 and a notification example 2 in the modified example 3 are described.

Notification Example 1 of Modified Example 3

In the notification example 1, although the notification method of the capability of the PCell is the same as the description so far, the base station eNB (MeNB in the case of DC, for example) reads capability information such that it is applied not only to a PCell but also to SCell/PUCCH-SCell.

That is, in a case where it is interpreted that a PCell can be set by TDD in a CA band combination based on the notification method described so far (example: TDD True is explicitly notified), the base station eNB interprets that not only the PCell but also the PSCell/PUCCH-SCell can be set by TDD. Also, in a case where it is interpreted that a PCell can be set by FDD in a CA band combination based on the notification method described so far (example: FDD True is explicitly notified), the base station eNB interprets that not only the PCell but also the PSCell/PUCCH-SCell can be set by FDD.

Also, in the notification example 1, since the base station eNB performs the above-mentioned interpretation, the user apparatus UE may perform the notification when the user apparatus UE has a capability, as an actual capability, the same as that the base station eNB interprets (that is, when PSCell/PUCCH-SCell can be also set by TDD), or the user apparatus UE may perform notification according to PCell setting ability irrespective of setting ability for PSCell/PUCCH-SCell.

Notification Example 2 of Modified Example 3

In the notification example 2, capability of PSCell/PUCCH-SCell is notified separately from the capability of PCell. That is, in the notification example 2, in addition to performing notification of capability on the PCell by the notification methods of capability on the PCell described so far in the basic example~the modified example 2, notification of capability on the PSCell/PUCCH-SCell is performed in the same way as the notification methods of capability on the PCell described so far in the basic example~the modified example 2. The notification of the capability on PSCell/PUCCH-SCell is notification in which PCell is replaced with PSCell/PUCCH-SCell in the notification methods of capability on the PCell described so far in the basic example~the modified example 2.

For example, the user apparatus UE notifies of the TDD PSCell capability on the PSCell (same applies to PUCCH-SCell) as shown in FIG. 13 and FIG. 14 in the same way as the notification methods shown in FIG. 7 and FIG. 9 in the case of the PCell. Notification may be performed for each CA combination separately as shown in FIG. 7, FIG. 9, FIG. 13 and FIG. 14, or capability may be collectively notified by information such as (TDD-PCell=False, FDD-PCell=True, TDD-PSCell/PUCCH-SCell=False, FDD-PSCell/PUCCH-SCell=True) for example. Also, in the case of PSCell/PUCCH-SCell, like the case of the PCell, notification may be performed for each UE, may be performed for each CA band combination, or may be performed for each combination of CA combinations.

Modified Example 4

As already described, linkage between duplex modes is difficult depending on UE implementation. For performing notification of presence or absence of the capability, notification of PCell (PSCell/PUCCH-SCell) capability is performed as described in the basic example the modified example 3 in one or more embodiments.

In the notification described in the basic example~the modified example 3, for example, a case is considered in which "FDD PCell=true, TDD PCell=false" is notified for a CA band combination of 2DL/2UL. In this case, as shown in the left side of FIG. 15, although CA by a combination of a FDD PCell and a TDD SCell is available, CA by a combination of a TDD PCell and a FDD SCell is unavailable. In the basis example~the modified example 3, it is assumed that, when the user apparatus UE has the capability shown in FIG. 15, the user apparatus UE notifies of "FDD PCell=true, TDD PCell=false", and the base station eNB that receives this interprets that the user apparatus UE has the capability shown in FIG. 15.

Figure 16:
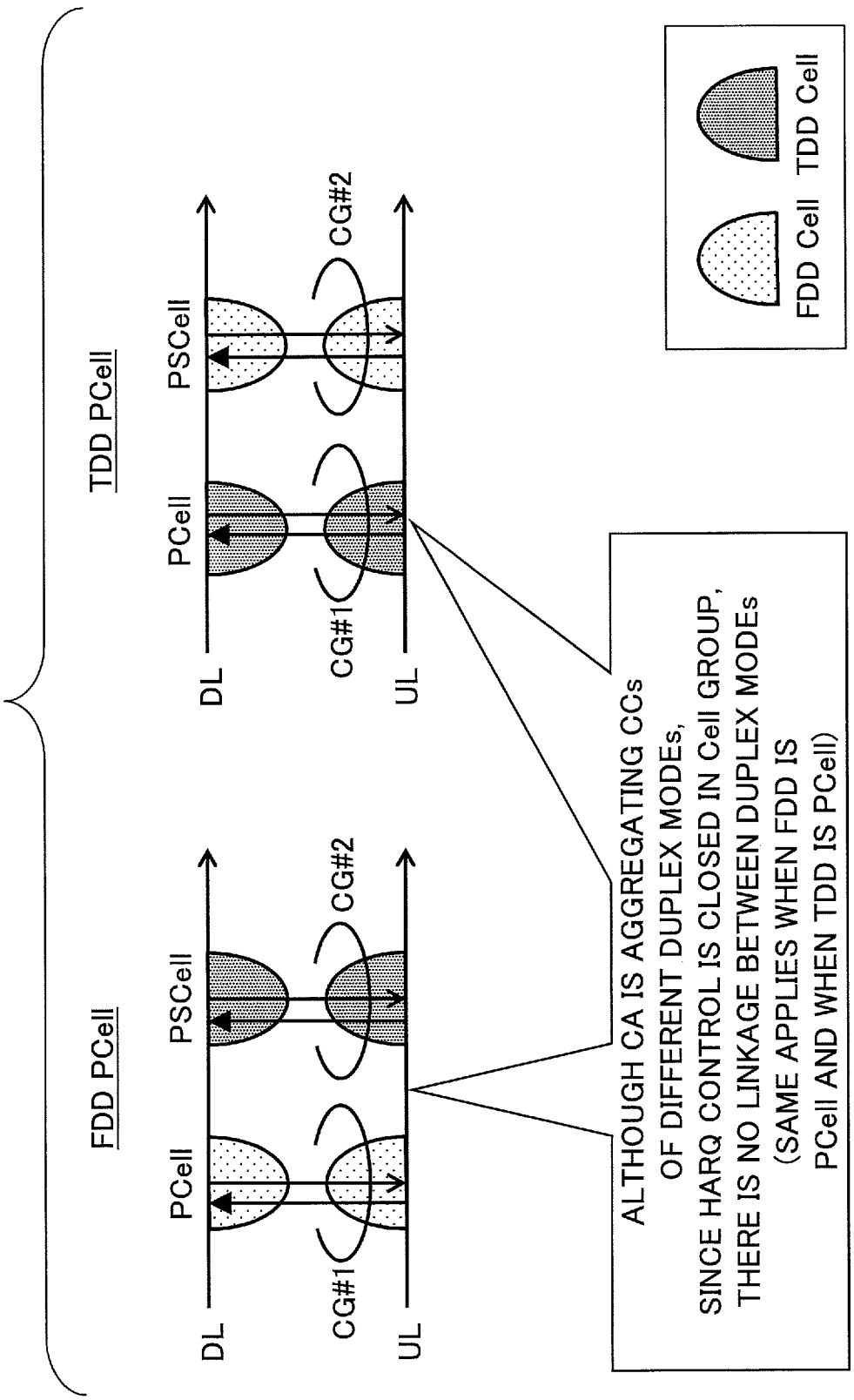
FIG. 16 is a diagram for explaining the modified example 4.

However, for example, as shown in FIG. 16, by introducing DC or CA with SCell PUCCH, CA becomes available even when there is no linkage between duplex modes depending on the manner of grouping for cells. That is, since the user apparatus UE to which DC/CA with SCell PUCCH is set performs HARQ control within a cell group to which CCs are grouped, any Cell (having UL) should be able to become a PCell as long as CCs of the same duplex mode are grouped as shown in FIG. 16. Therefore, in this case, TDD/FDD Cell can be selected as a PCell (same applies to PSCell/PUCCH-SCell) irrespective of availability of linkage between duplex modes.

Figure 17:
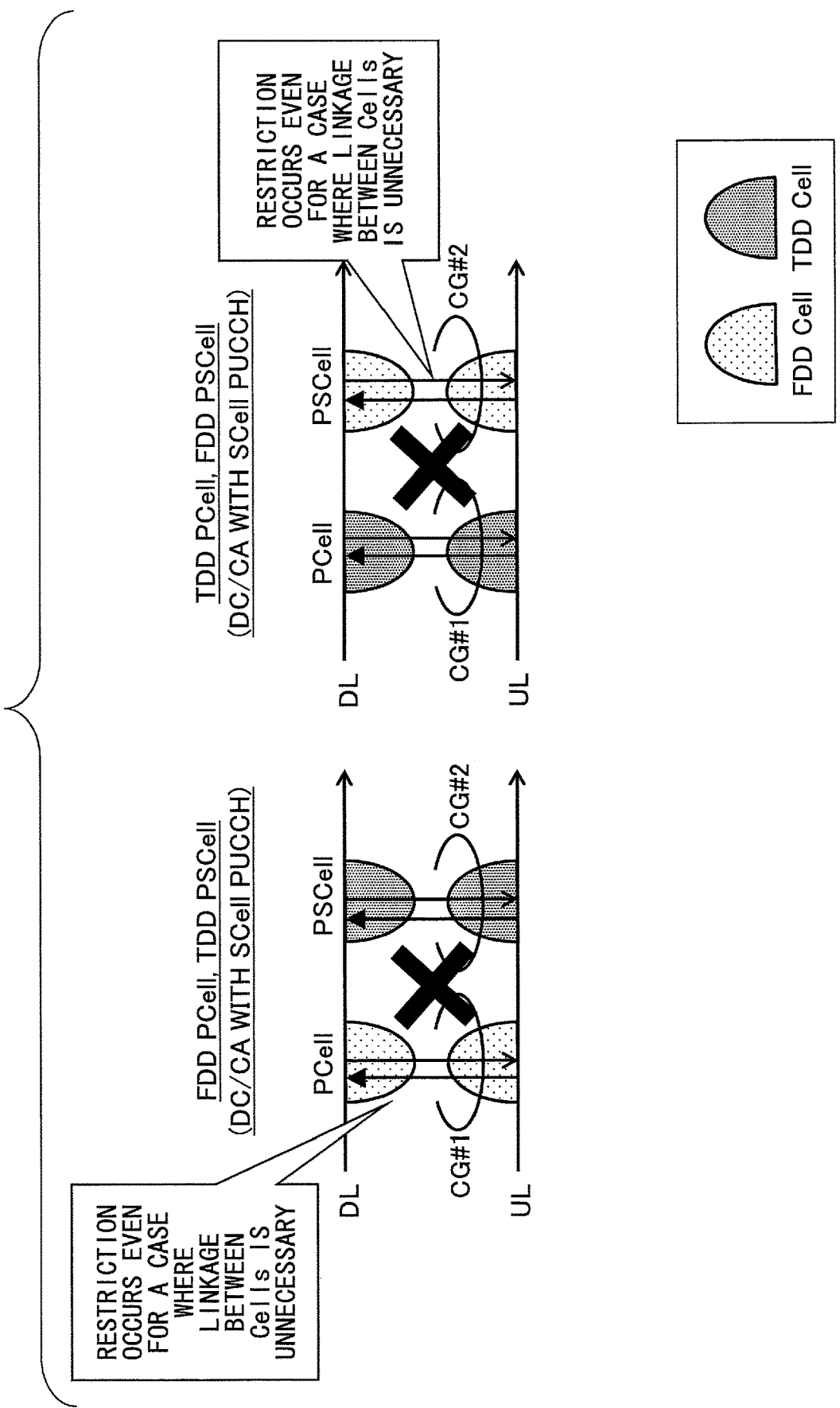
FIG. 17 is a diagram for explaining the modified example 4.

However, the notification in the basic example the modified example 3 dose not assume a case where linkage between duplex modes is unnecessary. Thus, for example, in the case of FDD PCell=true and TDD PCell=false, it is assumed that the base station eNB uniformly applies "FDD PCell=true, TDD PCell=false" as shown in FIG. 17 to interpret that PCell(PSCell/PUCCH-SCell) setting is unavailable even when PCell(PSCell/PUCCH-SCell) setting is actually available since linkage between duplex modes is unnecessary.

For the user apparatus UE, if such an interpretation is a prerequisite, there is no measure for notifying that PCell (PSCell/PUCCH-SCell) setting is available in the case of the grouping shown in FIG. 16.

Figure 15:
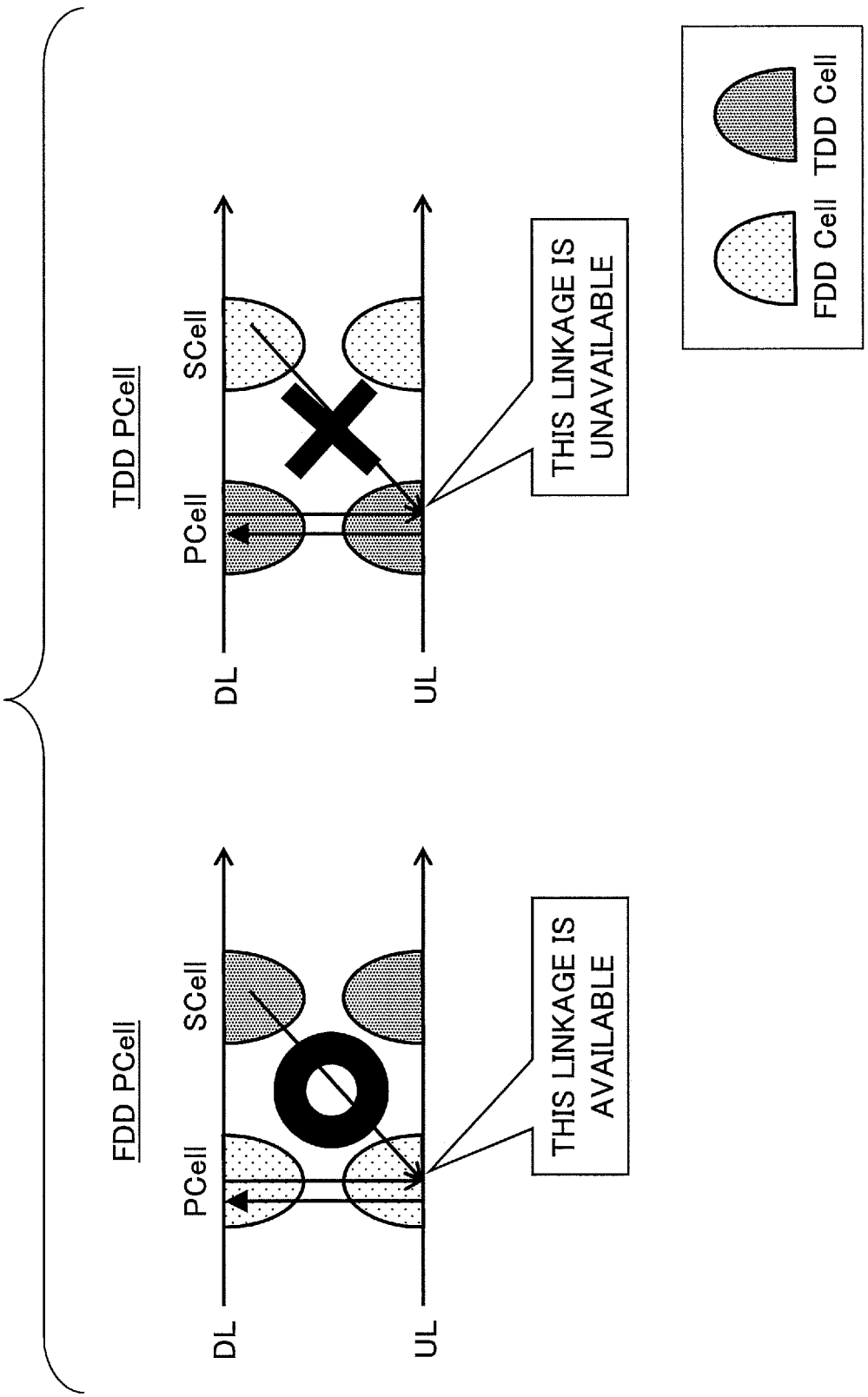
FIG. 15 is a diagram for explaining a modified example 4.

Thus, in the modified example 4, for example, as shown in FIG. 15, even though the user apparatus UE cannot perform cell linkage between duplex modes, the user apparatus can set the PCell(PSCell/PUCCH-SCell) in any cell in a configuration in which linkage is unnecessary as shown in FIG. 16.

Figure 18:
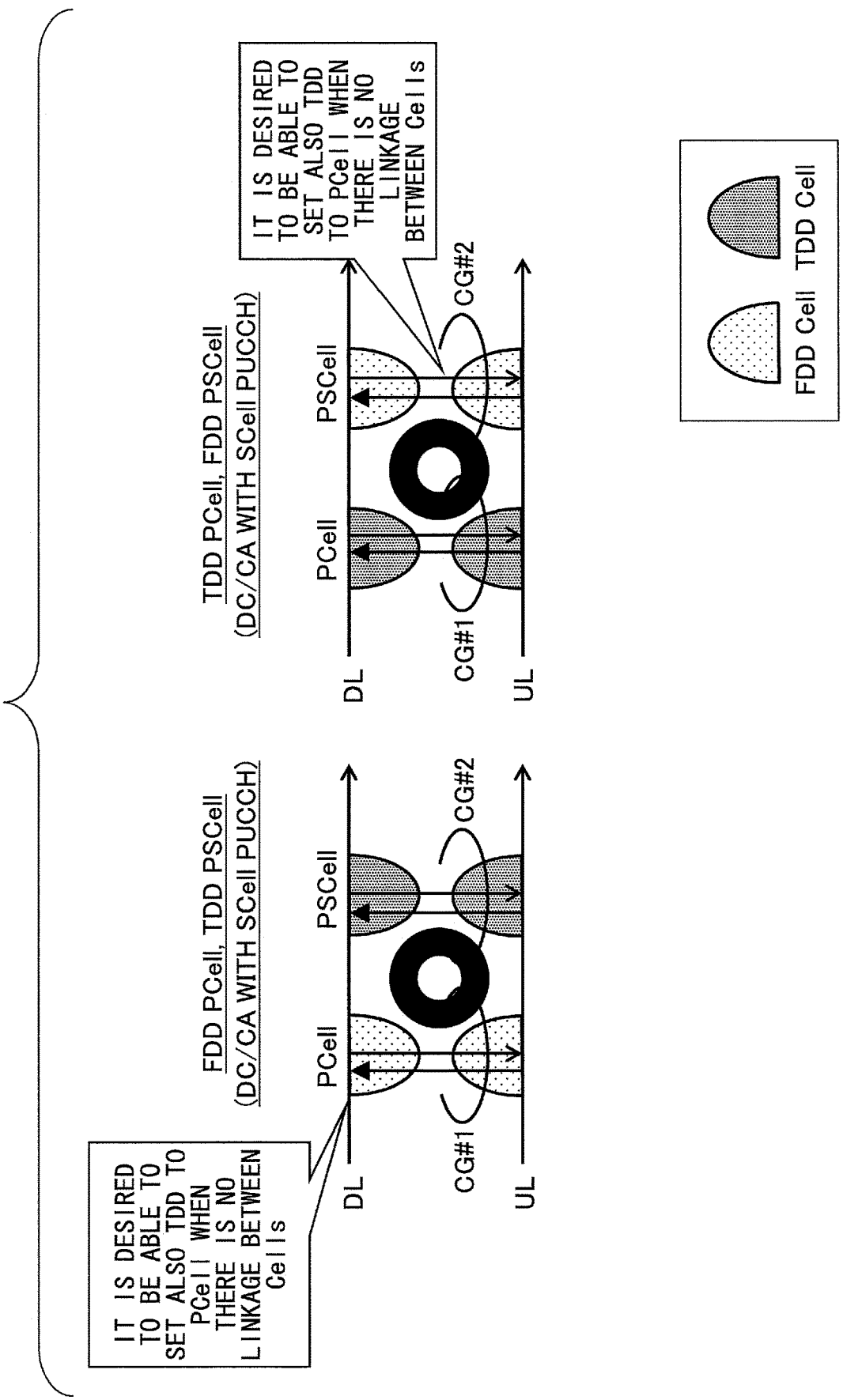
FIG. 18 is a diagram for explaining the modified example 4.

That is, in a case where the user apparatus UE notifies of "FDD PCell=true, TDD PCell=false", it indicates a capability in CA setting in which linkage is necessary as shown in FIG. 15, and in a case where linkage is unnecessary, it indicates that PCell(PSCell/PUCCH-SCell) can be set for any cell irrespective of the notification content "FDD PCell=true, TDD PCell=false" when CA setting of the grouping as shown in FIG. 18 is available. By the way, whether CA setting of the grouping is available or not can be notified by another capability notification (example: DC available, CA with SCell PUCCH available, or the like).

For enabling the above feature, in the modified example 4, the base station eNB interprets the capability on TDD/FDD of PCell (PSCell/PUCCH-SCell) received from the user apparatus UE as "when cells of different frame structures are set to the same cell group, a cell of a duplex mode notified as being capable can be set as PCell/PSCell (PUCCH SCell) in the cell group". The case where cells of different frame structures is set to the same cell group is a case where a cell group in which a cell of TDD and a cell of FDD coexist is set, and for example, it is the whole group of cells in the case of FIG. 15 (DC/CA with no SCell PUCCH), or, MCG or SCG in which a cell of TDD and a cell of FDD coexist in DC, or the like.

Also in the modified example 4, although the capability notification method itself is similar to one described in the basic example~the modified example 3 (including a case in which PCell is interpreted as PSCell/PUCCH-SCell, and the like), interpretation in the base station eNB is different. In the modified example 4, for example, when cells of different frame structures are not set to the same cell group, that is, as shown in FIG. 18, when the cell group is formed by only one duplex mode (that is, one frame structure type), the base station eNB interprets that setting of PCell (PSCell/PUCCH-SCell) is available in the cell group by the duplex mode irrespective of capability information received from the user apparatus UE.

The above-mentioned interpretation in the modified example 4 may be similarly applied to the user apparatus UE. That is, when the user apparatus UE notifies of a capability on TDD/FDD of PCell(PSCell/PUCCH-SCell), notification is performed while regarding that the capability is "when cells of different frame structures are set to the same cell group, a cell of a duplex mode notified as being capable can be set as PCell/PSCell (PUCCH SCell) in the cell group".

In the modified example 4, FIG. 19, FIG. 20 and FIG. 21 show examples of availability of PCell/PSCell setting according to setting content of CA in a case where capability of "FDD PCell=true, TDD PCell=false" is notified for a CA band combination of 3DL/3UL.

FIG. 19 is the case of no "DC/CA with SCell PUCCH", in which the whole becomes one cell group, and PCell availability becomes as indicated by "FDD PCell=true, TDD PCell=false" in accordance with the interpretation of "when cells of different frame structures are set to the same cell group".

FIG. 20 is a case of DC/CA with SCell PUCCH, in which, any of right side/left side, CG (cell group) #1 and CG #2 does not correspond to "when cells of different frame structures are set to the same cell group", thus, PCell/PSCell becomes available irrespective of notification content "FDD PCell=true, TDD PCell=false".

FIG. 21 is a case of DC/CA with SCell PUCCH, in which, since CG #2 does not correspond to "when cells of different frame structures are set to the same cell group", PSCell becomes available irrespective of notification content "FDD PCell=true, TDD PCell=false". On the other hand, CG #1 corresponds to "when cells of different frame structures are set to the same cell group", PCell availability follows the notification content "FDD PCell=true, TDD PCell=false".

Modified Example 5

Next, a modified example 5 is described. The PCell capability described in the basic example~the modified example 4 is basically set and notified for each CA band combination, but, capability of individual band within the combination is not notified. Therefore, for example, in a case where there are a plurality of TDD bands in a combination and TDD is true, it is interpreted that TDD PCell setting is available for every TDD band. For the user apparatus UE to notify that TDD is true when there are a plurality of TDD bands in a combination, it is necessary to verify that TDD PCell is available in any TDD band.

Figure 22:
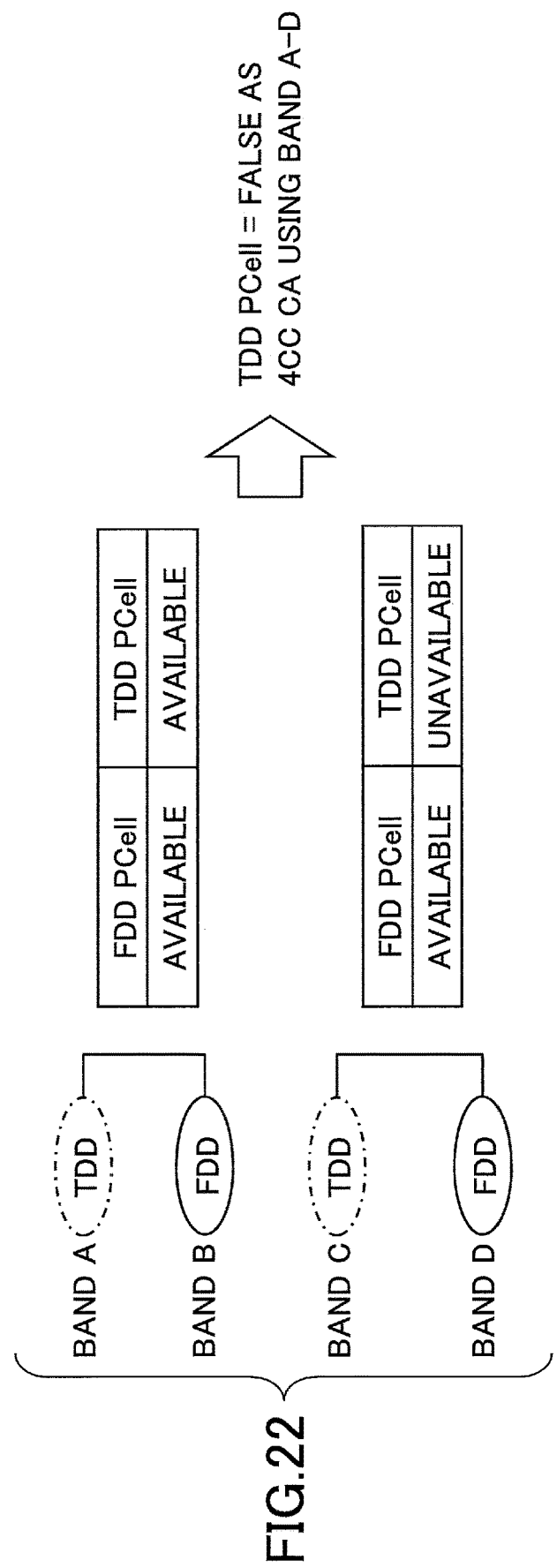
FIG. 22 is a diagram for explaining a modified example 5.

As an example, as shown in FIG. 22, in a case where TDD PCell is available in a combination of band A (TDD) and band B (FDD), and where TDD PCell is unavailable in a combination of band C (TDD) and band D (FDD), it is inevitable to set TDD PCell=false as for the 4CC CA using the four bands A-D.

However, in the above example, in a case where TDD PCell is available in the band A(TDD) as 4CC CA, the base station eNB cannot recognize it, and the user apparatus UE cannot notify of it. Thus, in the modified example 5, notification of the following notification example 1 and notification example 2 is performed. In the following examples, even when capability on only PCell is notified, it may be regarded as capability of PSCell/PUCCH-SCell, capability of PSCell/PUCCH-SCell may be notified separately from PCell, or the like, in the same way as described so far.

Notification Example 1 of the Modified Example 5

In the notification example 1, it is notified whether PCell(PSCell/PUCCH-SCell) is available by TDD/FDD for each band. The notification can be performed, for example, by using a bitmap corresponding to each band. When using a bitmap, the length of the bitmap may change for each CA band combination.

In the notification example 1, since it becomes an overhead to transmit bitmaps for all CA band combinations, the bitmap may be applied for a specific case. For example, a bitmap may be included when capability is "FDD PCell=false" or "TDD PCell=false" in a case where the capability is notified for each combination instead of each band. The reason is that, in the case of "FDD PCell=false" or "TDD PCell=false", there may be a band of true in the bands.

A concrete example of the notification example 1 is described with reference to FIG. 23. In the example of FIG. 23, there are bands A, B, C and D as shown in the figure, and 4DL/4UL is shown as combination 8, and 4DL/3UL is shown as combination 9.

Then, an example is shown in which PCell capability is notified by using a bitmap for each band. By the way, this is merely an example. In the combination 8, (A, B, C, D)=10010001 is notified. This indicates that each two bits correspond, in an order of bits, to each band (in an order of A, B, C and D), in which the first bit of the two bits indicates TDD PCell availability (1/0), and the next bit indicates FDD PCell availability. For example, 10010001 indicates band A (TDD PCell available, FDD PCell unavailable), band B (TDD PCell unavailable, FDD PCell available), band C (TDD PCell unavailable, FDD PCell unavailable), band D (TDD PCell unavailable, FDD PCell available). Same applies to combination 9. By the way, PCell availability may be indicated by one bit for each band.

By enabling the above-mentioned capability notification, the base station eNB can perform flexible control in consideration of capability for each band, and, for example, even when TDD PCell available and unavailable coexist, the user apparatus UE can notify of it.

Notification Example 2 of Modified Example 5

In the notification example 2, notification is performed by a combination of subsets of CA band combination, for example, in a case where 4 CC CA is available by bands A, B, C and D, A_B_C_D is notified in the CA band combination described so far. In the notification example 2 of the modified example 5, this is notified as (A_B)_(C_D) which indicates a combination of CA band combination A_B and CA band combination C_D, and PCell capability is notified for each of A_B and C_D. The capability may be notified by a bitmap to which two bits are assigned for each CA combination of the subset, for example.

As to which combination of subsets to use for notifying of the whole combination (example: A_B_C_D), for example, it can be considered to select subsets including both of TDD and FDD so as to perform notification by the combination. A_B and C_D are the example.

The concrete example of the notification example 2 is described with reference to FIG. 24. In the example of FIG. 24, there are bands A, B, C and B as shown in the figure, and 4DL/4UL is shown as combination 8, and 4DL/3UL is shown as combination 9.

As described above, in each of UL and DL, as to the combination of 4 CCs, (A_B)_(C_D) is notified, and, for the combination of 3 CCs, (A_B)_C is notified as an example.

As to PCell capability, a bitmap is used in this example. For example, as to 1101 of the combination 8, the first two bits indicate a bit of TDD PCell availability and a bit of FDD PCell availability in (A_B), and the next two bits indicate a bit of TDD PCell availability and a bit of FDD PCell availability in (C_D). Same applies to combination 9.

By enabling the above-mentioned capability notification, the base station eNB can perform flexible control in consideration of capability for each combination of subsets, and, for example, even when TDD PCell available and unavailable coexist in the whole combination, the user apparatus UE can notify of it.

The basic example and all modified examples described so far can be executed in any combination as long as inconsistency does not occur.

(apparatus Configuration, Operation Flow)

In the following, examples of configurations and operation flows of the user apparatus UE and the base station eNB in one or more embodiments (including the basic example and all modified examples) are described.

<User Apparatus UE>

Figure 25:
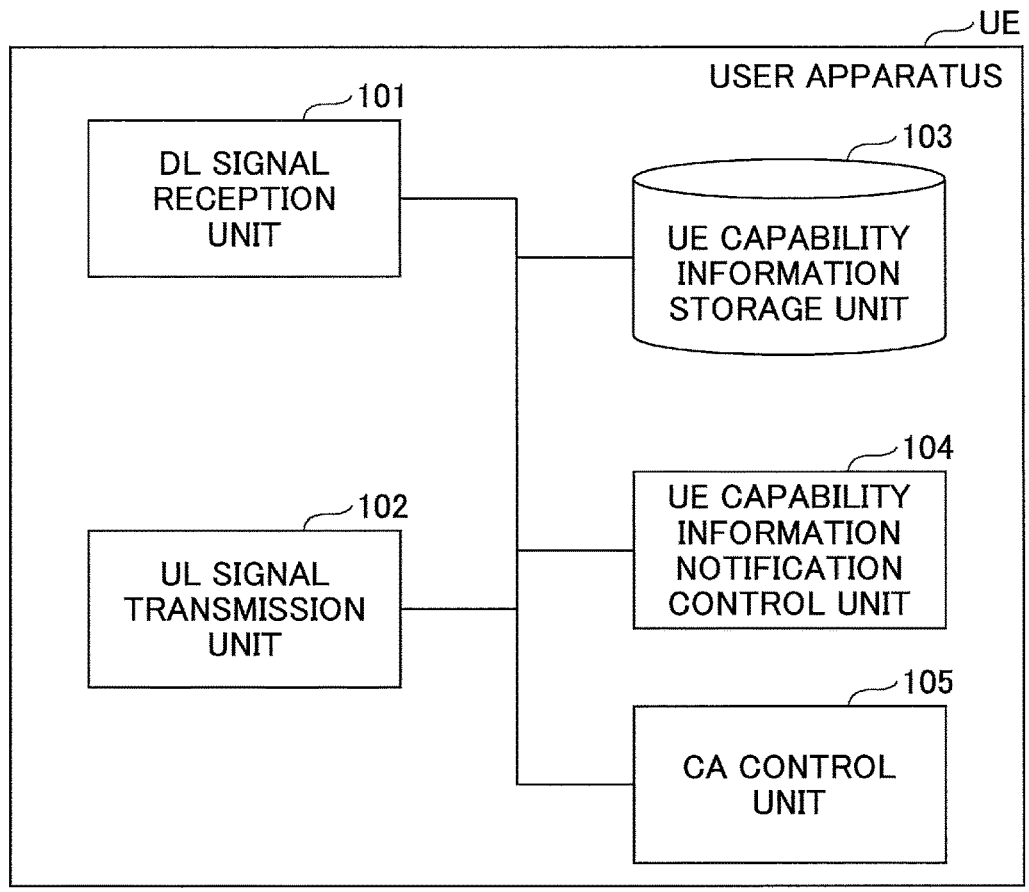
FIG. 25 is a functional block diagram of a user apparatus UE in one or more embodiments of the present invention.

FIG. 25 shows a functional block diagram, of the user apparatus UE in one or more embodiments. As shown in FIG. 25, the user apparatus UE includes a DL signal reception unit 101, an UL signal transmission unit 102, a UE capability information storage unit 103, a UE capability information notification control unit 104, and a CA control unit 105. FIG. 25 only shows functional units especially related to the present invention in the user apparatus UE, and the user apparatus UE also includes at least functions, not shown in the figure, for performing operation complying with LTE.

The DL signal reception unit 101 includes a function configured to receive various downlink signals from the base station eNB to obtain upper layer information from the received physical layer signals. The UL signal transmission unit 102 includes a function configured to generate various signals of physical layer from upper layer information to be transmitted from the user apparatus UE to transmit the signals to the base station eNB.

The UE capability information storage unit 103 stores UE capability information including CA band combinations that the user apparatus UE supports, TDD/FDD-PCell setting capability, Full/Half-duplex capability, DC/CA with SCell PUCCH capability and the like.

When transmitting CA band combination information to the base station eNB, the UE capability information notification control unit 104 refers to the UE capability information storage unit 103, and causes the UL signal transmission unit 102 to perform transmission of CA band combination information to which TDD/FDD-PCell setting capability or Full/Half-duplex capability is added explicitly or implicitly. The notification method is as described in the basic example~the modified example 5. The UL signal transmission unit 102 carries the CA band combination information on a predetermined message so as to transmit the message to the base station eNB by a channel such as a PUSCH and a PUCCH and the like, for example.

The CA control unit 105 performs management of a PCell (PCC) and an SCell (SCC) that form CA, and performs control on CA in the user apparatus UE such as addition/deletion, Activation/Deactivation of an SCell and the like based on an instruction from the base station eNB. Also, the CA control unit 105 can also perform control of CA with SCell PUCCH.

Figure 26:
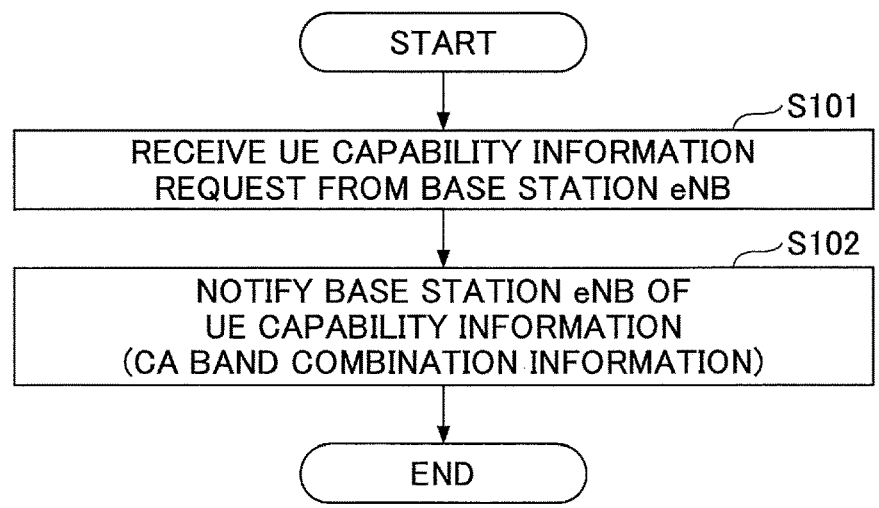
FIG. 26 is a flowchart showing operation of the user apparatus UE.

Next, an operation example of the user apparatus is described with reference to a flowchart of FIG. 26.

For example, at a timing when the user apparatus UE connects to the base station eNB (timing at which RRC connection is established), the user apparatus UE receives UE capability information request from the base station eNB (step 101). The user apparatus UE transmits, to the base station eNB, CA band combination information to which TDD/FDD-PCell setting capability or Full/Half-duplex capability is added explicitly or implicitly according to the UE capability information request (step 102).

In step 102, the UE capability information notification control unit 104 of the user apparatus UE refers to the UE capability information storage unit 103 to obtain information of CA band combinations that can be supported, and determines availability of PCell setting by TDD(FDD) for CA band combinations in which PCell setting by TDD (FDD) may be performed so as to, based on the determination, add a flag to the CA combination information (notification example 1 in the basic example), or to perform control not to notify of a part of CA band combination (notification example 2 of the basic example), or to perform notification described in each modified example.

When it is assumed that the capability of the user apparatus UE is fixed, instead of performing the above-mentioned determination every time, CA band combination information and implicit or explicit additional information that are predetermined (stored in storage means) based on the capability of the user apparatus UE may be transmitted.

The functional configuration of the user apparatus UE is not limited to that described above, and any configuration that can realize processing described in one or more embodiments may be adopted. For example, a user apparatus that can be used as the user apparatus UE is a user apparatus in a mobile communication system configured to perform carrier aggregation using a band of a first duplex mode and a band of a second duplex mode, including:

an information storage unit configured to store band combination information indicating a combination of bands that can be used in the carrier aggregation in the user apparatus; and a notification control unit configured to explicitly or implicitly add, to the band combination information, capability information indicating whether the user apparatus is able to set a primary cell by using a band of the first duplex mode in the carrier aggregation so as to notify a base station of the band combination information to which the capability information is added.

For example, the notification control unit adds capability information indicating whether the user apparatus is able to set a primary cell by using a band of the first duplex mode for each band combination in which a primary cell may be set using a band of the first duplex mode so as to notify the base station of the band combination information to which the capability information is added. According to this configuration, it is possible to properly report capability information indicating whether the user apparatus is able to set a primary cell using a band of the first duplex mode for each band combination.

The notification control unit can also notify the base station of the band combination information in which a part of band combinations is excluded from among band combinations in which the user apparatus is not able to set a primary cell using a band of the first duplex mode to notify that the user apparatus is not able to set a primary cell using a band of the first duplex mode also for a band combination that has the part of combinations as a subset. According to this configuration, notification can be performed without adding an information element to a current message.

Also, in a case where the user apparatus is able to set a primary cell by using a band of the first duplex mode, the notification control unit can notify the base station of the band combination information without adding the capability information to the band combination information. According to this configuration, notification can be performed without adding an information element to a current message.

When the user apparatus is not able to set a primary cell using a band of the first duplex mode, the notification control unit may explicitly or implicitly notify the base station of capability information indicating whether the user apparatus supports a full-duplex mode or a half-duplex mode. According to this configuration, the base station can ascertain whether the user apparatus supports a full-duplex mode or a half-duplex mode so that the base station can perform proper control for the user apparatus.

For example, the first duplex mode is TDD and the second duplex mode is FDD, or the first duplex mode is FDD and the second duplex mode is TDD.

The notification control unit may notify of the capability information on the primary cell as capability information on a PSCell in dual connectivity, or capability information on a secondary cell in which a PUCCH is set. According to this configuration, it becomes possible to report capability information on a PSCell in dual connectivity, or capability information on a secondary cell in which a PUCCH is set.

The notification control unit may notify of, in addition to the capability information on the primary cell, capability information on a PSCell in dual connectivity, or capability information on a secondary cell in which a PUCCH is set. According to this configuration, it becomes possible to report capability information on a PSCell in dual connectivity, or capability information on a secondary cell in which a PUCCH is set.

The notification control unit may notify of the capability information on the primary cell as, when setting cells of different frame structures to a same cell group, capability information on a primary cell that is set in the same cell group. According to this configuration, it becomes possible to perform flexible control, for example, to set any duplex mode in PCell when cells of different frame structures are not set to the same cell group.

The notification control unit may notify of the capability information for each band that forms a combination of bands. According to this configuration, control according to capability of each band can be realized.

The notification control unit may notify of band combination information as a combination of sets of a plurality of bands that form a combination of bands, and notify of the capability information for each set of the plurality of bands. According to this configuration, control according to capability of each set of a plurality of bands can be realized.

<Base Station eNB>

Figure 27:
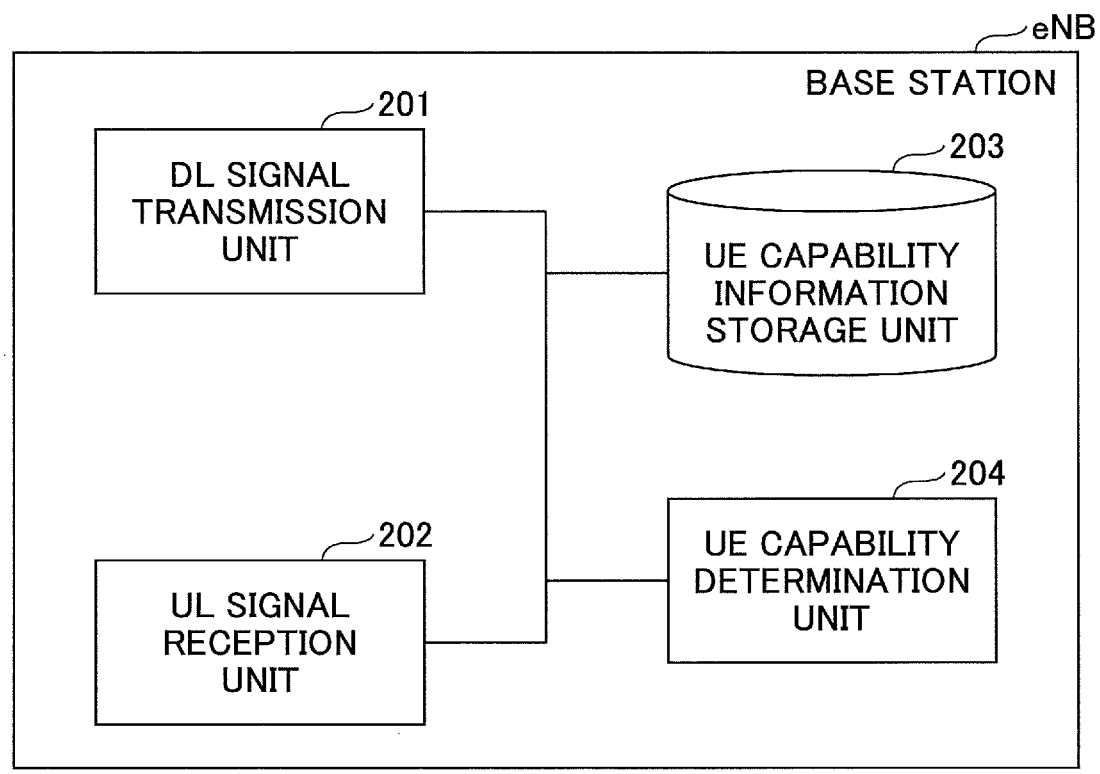
FIG. 27 is a functional block diagram of a base station eNB in one or more embodiments of the present invention.

FIG. 27 shows a functional block diagram of the base station eNB in one or more embodiments. As shown in FIG. 27, the base station eNB includes a DL signal transmission unit 201, an UL signal reception unit 202, a UE capability information storage unit 203, and a UE capability determination unit 204. FIG. 27 only shows functional units especially related to one or more embodiments of the present invention in the base station eNB, and the base station eNB also includes at least functions, not shown in the figure, for performing operation complying with LTE.

The DL signal transmission unit 201 includes a function configured to generate various signals of physical layer from upper layer information to be transmitted from the base station eNB to transmit the signals to the user apparatus UE.

The UL signal reception unit 202 includes a function configured to receive various uplink signals from the user apparatus UE to obtain upper layer information from the received physical layer signals.

The UE capability information storage unit 203 stores UE capability information (including CA band combination information, TDD/FDD-PCell capability information and the like) for each UE. The UE capability information stored in the UE capability information storage unit 203 is used as setting (configuration) and the like on CA (including DC, CA with SCell PUCCH) to the user apparatus UE.

When receiving, from the user apparatus UE, CA band combination information to which TDD/FDD-PCell setting capability or Full/Half-duplex capability is added explicitly or implicitly, the UE capability determination unit 204 determines TDD (or FDD)-PCell setting capability or Full/Half-duplex ability, and stores, in the UE capability information storage unit 203, capability information including the determined capability and CA band combination and the like. The determination performed by the UE capability determination unit 204 includes not only determination in the basic example but also determination based on interpretation described in each modified example.

An operation example of the base station eNB is described with reference to a flowchart of FIG. 28. FIG. 28 corresponds to the notification example 2 of the basic example in which information is added implicitly.

The base station eNB receives CA band combination information from the user apparatus UE by the UL signal reception unit 202 (step 201). Next, the UE capability determination unit 204 of the base station eNB determines whether there is a CA band combination (that may perform TDD(or FDD)-PCell setting) of a subset that is not notified for an upper CA band combination in which TDD(or FDD)-PCell setting may be performed in the CA band combination information (step 202).

When there is a CA band combination of a subset that is not notified (Yes in step 202), the UE capability determination unit 204 of the base station eNB determines that TDD(FDD)-PCell is not supported for the CA band combination having the not-notified CA band combination as a subset (step 203). When there is not the CA band combination of the subset that is not notified (No in step 202), the UE capability determination unit 204 of the base station eNB determines that all CA band combinations having a band of TDD (FDD) in DL and UL support TDD(FDD)-PCell (step 204). Capability information corresponding to these determination results is stored in the UE capability information storage unit 203.

After the base station eNB receives the CA band combination information, for example, the base station eNB determines which CA combination to apply from among CA combinations that are supported by the user apparatus UE based on communication quality and the like for each CC of the user apparatus UE, and performs operation of notifying (configuring) the user apparatus UE of the determined CA combination.

The functional configuration of the base station eNB is not limited to that described above, and any configuration that can realize processing described in one or more embodiments may be adopted. For example, a base station that can be used as the base station eNB is a base station in a mobile communication system configured to perform carrier aggregation using a band of a first duplex mode and a band of a second duplex mode, including:

a reception unit configured to receive band combination information indicating a combination of bands in the carrier aggregation from the user apparatus; and a determination unit configured to determine whether the user apparatus is able to set a primary cell using a band of the first duplex mode in the carrier aggregation based on capability information that is explicitly or implicitly added to the band combination information received by the reception unit.

When the reception unit receives the band combination information in which a part of band combinations is excluded from among band combinations in which the user apparatus is not able to set a primary cell using a band of the first duplex mode, the determination unit may determine that the user apparatus is not able to set a primary cell using a band of the first duplex mode also for a band combination that has the part of combinations as a subset. According to this configuration, notification can be performed without adding an information element to the current message.

The determination unit may interpret the primary cell as a PSCell in dual connectivity, or a secondary cell in which a PUCCH is set, and perform determination on the PSCell in dual connectivity, or the secondary cell in which a PUCCH is set. According to this configuration, it becomes possible to properly perform setting control on the PSCell in dual connectivity, or the secondary cell in which a PUCCH is set.

The determination unit may receive, in addition to the capability information on the primary cell, capability information on a PSCell in dual connectivity, or capability information on a secondary cell in which a PUCCH is set, and perform determination on the PSCell in dual connectivity, or the secondary cell in which a PUCCH is set. According to this configuration, it becomes possible to properly perform setting control on the PSCell in dual connectivity, or the secondary cell in which a PUCCH is set.

The determination unit may perform the determination by interpreting the capability information on the primary cell as, when setting cells of different frame structures to a same cell group, capability information on a primary cell that is set in the same cell group. According to this configuration, it becomes possible to perform flexible control, such as, to set any duplex mode in PCell when cells of different frame structures are not set to the same cell group.

The reception unit may receive the capability information with the band combination information as information for each band that forms a combination of bands. According to this configuration, control according to capability of each band can be realized.

The reception unit may receive band combination information as a combination of sets of a plurality of bands that form a combination of bands, and receive the capability information as information for each set of the plurality of bands. According to this configuration, control according to capability of each set of a plurality of bands can be realized.

The user apparatus UE described in one or more embodiments may be configured such that, in the user apparatus UE that includes a CPU and a memory, a program is executed by the CPU (processor), or may be configured by hardware such as hardware circuits including logics of processing described in one or more embodiments, or may be configured by coexistence of a program and hardware.

The base station eNB described in one or more embodiments may be configured such that, in the base station eNB that includes a CPU and a memory, a program is executed by the CPU (processor), or may be configured by hardware such as hardware circuits including logics of processing described in one or more embodiments, or may be configured by coexistence of a program and hardware. In the following, configurations disclosed in the specification are recited as examples.

(Item 1)

A user apparatus in a mobile communication system configured to perform carrier aggregation using a band of a first duplex mode and a band of a second duplex mode, including:

an information storage unit configured to store band combination information indicating a combination of bands that can be used in the carrier aggregation in the user apparatus; and a notification control unit configured to explicitly or implicitly add, to the band combination information, capability information indicating whether the user apparatus is able to set a primary cell by using a band of the first duplex mode in the carrier aggregation so as to notify a base station of the band combination information to which the capability information is added.

(Item 2)

The user apparatus as described in item 1, wherein the notification control unit adds capability information indicating whether the user apparatus is able to set a primary cell by using a band of the first duplex mode for each band combination in which a primary cell may be set using a band of the first duplex mode so as to notify the base station of the band combination information to which the capability information is added.

(Item 3)

The user apparatus as described in item 1 or 2, wherein the notification control unit notifies the base station of the band combination information in which a part of band combinations is excluded from among band combinations in which the user apparatus is not able to set a primary cell using a band of the first duplex mode so as to notify that the user apparatus is not able to set a primary cell using a band of the first duplex mode also for a band combination that has the part of combinations as a subset.

(Item 4)

The user apparatus as described in item 1, wherein, in a case where the user apparatus is able to set a primary cell using a band of the first duplex mode, the notification control unit notifies the base station of the band combination information without adding the capability information to the band combination information.

(Item 5)

The user apparatus as described in any one of items 1-4, wherein, when the user apparatus is not able to set a primary cell using a band of the first duplex mode, the notification control unit explicitly or implicitly notifies the base station of capability information indicating whether the user apparatus supports a full-duplex mode or a half-duplex mode.

(Item 6)

The user apparatus as described in any one of items 1-5, wherein the first duplex mode is TDD and the second duplex mode is FDD, or the first duplex mode is FDD and the second duplex mode is TDD.

(Item 7)

The user apparatus as described in any one of items 1-6, wherein the notification control unit notifies of the capability information on the primary cell as capability information on a PSCell in dual connectivity, or capability information on a secondary cell in which a PUCCH is set.

(Item 8)

The user apparatus as described in any one of items 1-6, wherein the notification control unit notifies of, in addition to the capability information on the primary cell, capability information on a PSCell in dual connectivity, or capability information on a secondary cell in which a PUCCH is set.

(Item 9)

The user apparatus as described in any one of items 1-8, wherein the notification control unit notifies of the capability information on the primary cell as, when setting cells of different frame structures to a same cell group, capability information on a primary cell that is set in the same cell group.

(Item 10)

The user apparatus as claimed in any one of claims 1-9, wherein the notification control unit notifies of the capability information for each band that forms a combination of bands.

(Item 11)

The user apparatus as described in any one of items 1-9, wherein the notification control unit notifies of band combination information as a combination of sets of a plurality of bands that form a combination of bands, and notifies of the capability information for each set of the plurality of bands.

(Item 12)

A base station in a mobile communication system configured to perform carrier aggregation using a band of a first duplex mode and a band of a second duplex mode, including:

a reception unit configured to receive band combination information indicating a combination of bands in the carrier aggregation from the user apparatus; and a determination unit configured to determine whether the user apparatus is able to set a primary cell using a band of the first duplex mode in the carrier aggregation based on capability information that is explicitly or implicitly added to the band combination information received by the reception unit.

(Item 13)

The base station as described in item 12, wherein, when the reception unit receives the band combination information in which a part of band combinations is excluded from among band combinations in which the user apparatus is not able to set a primary cell using a band of the first duplex mode, the determination unit determines that the user apparatus is not able to set a primary cell using a band of the first duplex mode also for a band combination that has the part of combinations as a subset.

(Item 14)

The base station as described in item 12 or item 13, wherein the determination unit interprets the primary cell as a PSCell in dual connectivity, or a secondary cell in which a PUCCH is set, and performs determination on the PSCell in dual connectivity, or the secondary cell in which a PUCCH is set.

(Item 15)

The base station as described in item 12 or item 13, wherein the determination unit receives, in addition to the capability information on the primary cell, capability information on a PSCell in dual connectivity, or capability information on a secondary cell in which a PUCCH is set, and performs determination on the PSCell in dual connectivity, or the secondary cell in which a PUCCH is set.

(Item 16)

The base station as described in any one of items 12-15, wherein the determination unit performs the determination by interpreting the capability information on the primary cell as, when setting cells of different frame structures to a same cell group, capability information on a primary cell that is set in the same cell group.

(Item 17)

The base station as described in any one of items 12-16, wherein the reception unit receives the capability information with the band combination information as information for each band that forms a combination of bands.

(Item 18)

The base station as described in any one of items 12-16, wherein the reception unit receives band combination information as a combination of sets of a plurality of bands that form a combination of bands, and receives the capability information as information for each set of the plurality of bands.

(Item 19)

An information notification method executed by a user apparatus in a mobile communication system configured to perform carrier aggregation using a band of a first duplex mode and a band of a second duplex mode, the user apparatus being provided with an information storage unit configured to store band combination information indicating a combination of bands that can be used in the carrier aggregation in the user apparatus, the information notification method including:

a notification step in which the user apparatus explicitly or implicitly adds, to the band combination information, capability information indicating whether the user apparatus is able to set a primary cell by using a band of the first duplex mode in the carrier aggregation so as to notify a base station of the band combination information to which the capability information is added.

(Item 20)

A capability determination method executed by a base station in a mobile communication system configured to perform carrier aggregation using a band of a first duplex mode and a band of a second duplex mode, including:

a reception step of receiving band combination information indicating a combination of bands in the carrier aggregation from the user apparatus; and a determination step of determining whether the user apparatus is able to set a primary cell using a band of the first duplex mode in the carrier aggregation based on capability information that is explicitly or implicitly added to the band combination information received by the reception unit.

In the above, embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, such an apparatus may be implemented in hardware, software, or a combination thereof.

The software executed by a processor provided in the user apparatus according to one or more embodiments of the present invention and the software executed by a processor provided in the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiments and is intended to include various variations, modifications, alterations, substitutions and so on without departing from the spirit of the present invention.

The present international patent application claims priority based on Japanese patent application No. 2014-029957, filed in the JPO on Feb. 19, 2014, and Japanese patent application No. 2014-161843, filed in the JPO on Aug. 7, 2014, and the entire contents of the Japanese patent application No. 2014-029957 and the Japanese patent application No. 2014-161843 are incorporated herein by reference.

DESCRIPTION OF REFERENCE SIGNS

UE user apparatus
eNB base station
10 core network
101 DL signal reception unit
102 UL signal transmission unit
103 UE capability information storage unit
104 UE capability information notification control unit
105 CA control unit
201 DL signal transmission unit
202 UL signal reception unit
203 UE capability information storage unit
204 UE capability determination unit

The invention claimed is:

1. A user apparatus in a mobile communication system configured to perform carrier aggregation using a band of a first duplex mode and a band of a second duplex mode, comprising:
   a memory that stores band combination information indicating a combination of bands that can be used in the carrier aggregation in the user apparatus; and
   a processor that explicitly or implicitly adds, to the band combination information, capability information indicating whether the user apparatus is able to set a primary cell or a Primary Secondary Cell (PSCell) in dual connectivity using the band of the first duplex mode in the carrier aggregation, and notifies a base station of the band combination information to which the capability information is added,
   wherein one of the first and second duplex modes is time division duplex (TDD) mode and the other of the first and second duplex mode is frequency division duplex (FDD) mode,
   wherein the mobile communication system is configured to perform the carrier aggregation using a combination of the TDD mode and the FDD mode, and
   wherein a physical uplink control channel that carries an acknowledgement or a negative acknowledgement is transmitted only by the primary cell in a Master Cell Group (MCG) and only by the PSCell in a Secondary Cell Group (SCG) in the dual connectivity.

2. The user apparatus as claimed in claim 1, wherein the processor adds capability information indicating whether the user apparatus is able to set the cell by using a band of the first duplex mode for each band combination in which the cell may be set using a band of the first duplex mode, and notifies the base station of the band combination information to which the capability information is added.

3. The user apparatus as claimed in claim 1, wherein, in a case where the user apparatus is able to set the cell using a band of the first duplex mode, the processor notifies the base station of the band combination information without adding the capability information to the band combination information.

4. The user apparatus as claimed in claim 1, wherein, when the user apparatus is not able to set the cell using a band of the first duplex mode, the processor explicitly or implicitly notifies the base station of capability information indicating whether the user apparatus supports a full-duplex mode or a half-duplex mode.

5. The user apparatus as claimed in claim 1,
   wherein the cell is the primary cell, and
   wherein the processor notifies the base station of, in addition to the capability information on the primary cell, capability information on a PSCell in dual connectivity.

6. The user apparatus as claimed in claim 1, wherein the processor notifies of the capability information on the cell as, when setting cells of different frame structures to a same cell group, capability information on a cell that is set in the same cell group.

7. The user apparatus as claimed in claim 1, wherein the processor notifies of the capability information for each band that forms a combination of bands.

8. The user apparatus as claimed in claim 1, wherein the processor notifies of band combination information as a combination of sets of a plurality of bands that form a combination of bands, and notifies of the capability information for each set of the plurality of bands.

9. The user apparatus as claimed in claim 2, wherein, when the user apparatus is not able to set the cell using a band of the first duplex mode, the processor explicitly or implicitly notifies the base station of capability information indicating whether the user apparatus supports a full-duplex mode or a half-duplex mode.

10. The user apparatus as claimed in claim 3, wherein, when the user apparatus is not able to set the cell using a band of the first duplex mode, the processor explicitly or implicitly notifies the base station of capability information indicating whether the user apparatus supports a full-duplex mode or a half-duplex mode.

11. The user apparatus as claimed in claim 2,
    wherein the cell is the primary cell, and
    wherein the processor notifies the base station of, in addition to the capability information on the primary cell, capability information on a PSCell in dual connectivity.

12. The user apparatus as claimed in claim 3,
    wherein the cell is the primary cell, and
    wherein the processor notifies the base station of, in addition to the capability information on the primary cell, capability information on a PSCell in dual connectivity.

13. The user apparatus as claimed in claim 2, wherein the processor notifies of the capability information on the cell as, when setting cells of different frame structures to a same cell group, capability information on a cell that is set in the same cell group.

14. The user apparatus as claimed in claim 3, wherein the processor notifies of the capability information on the cell as, when setting cells of different frame structures to a same cell group, capability information on a cell that is set in the same cell group.

15. The user apparatus as claimed in claim 2, wherein the processor notifies of the capability information for each band that forms a combination of bands.

16. The user apparatus as claimed in claim 2, wherein the processor notifies of band combination information as a combination of sets of a plurality of bands that form a combination of bands, and notifies of the capability information for each set of the plurality of bands.

17. A base station in a mobile communication system configured to perform carrier aggregation using a band of a first duplex mode and a band of a second duplex mode, comprising:
   a receiver that receives band combination information indicating a combination of bands in the carrier aggregation from the user apparatus; and
   a processor that determines whether the user apparatus is able to set a primary cell or a Primary Secondary Cell (PSCell) in dual connectivity using the band of the first duplex mode in the carrier aggregation based on capability information that is explicitly or implicitly added to the band combination information received by the receiver, wherein one of the first and second duplex modes is time division duplex (TDD) mode and the other of the first and second duplex mode is frequency division duplex (FDD) mode, wherein the mobile communication system is configured to perform the carrier aggregation using a combination of the TDD mode and the FDD mode, and wherein a physical uplink control channel that carries an acknowledgement or a negative acknowledgement is transmitted only by the primary cell in a Master Cell Group (MCG) and only by the PSCell in a Secondary Cell Group (SCG) in the dual connectivity.

* * * * *